United States Patent
Chau et al.

(10) Patent No.: US 12,381,839 B1
(45) Date of Patent: Aug. 5, 2025

(54) EXPANDING ONLINE CHAT COMMUNICATIONS BASED ON CHAT CONTEXT

(71) Applicant: Zoom Video Communications, Inc., San Jose, CA (US)

(72) Inventors: Vi Dinh Chau, Seattle, WA (US); Shamil Chollampatt Muhammed Ashraf, Singapore (SG); Minh-Quang Pham, Karlsruhe (DE); Marco Turchi, Trento (IT); Mango Li An Huang, San Francisco, CA (US)

(73) Assignee: Zoom Communications, Inc., San Jose, CA (US)

(*) Notice: Subject to any disclaimer, the term of this patent is extended or adjusted under 35 U.S.C. 154(b) by 0 days.

(21) Appl. No.: 18/368,993

(22) Filed: Sep. 15, 2023

(51) Int. Cl.
| | |
|---|---|
| *G06F 15/16* | (2006.01) |
| *H04L 12/18* | (2006.01) |
| *H04L 51/043* | (2022.01) |
| *H04L 51/216* | (2022.01) |

(52) U.S. Cl.
CPC ........ *H04L 51/216* (2022.05); *H04L 12/1822* (2013.01); *H04L 12/1831* (2013.01); *H04L 51/043* (2013.01)

(58) Field of Classification Search
None
See application file for complete search history.

(56) References Cited

U.S. PATENT DOCUMENTS

2023/0023160 A1* 1/2023 Schemers ............. H04L 51/214

OTHER PUBLICATIONS

Vaswani et al., "Attention-is-All-You-Need", 31st Conference on Neutral Information Processing Systems, (NIPS 2017), Long Beach, CA, 11 pages.
Lewis et al., "BART: Denoising Sequence -to-Sequence Pre-training for Natural Language Generation, Translation and Comprehension", Oct. 29, 2019, 10 pages.

* cited by examiner

*Primary Examiner* — Wing F Chan
*Assistant Examiner* — Andrew Woo
(74) *Attorney, Agent, or Firm* — Kilpatrick Townsend & Stockton LLP

(57) ABSTRACT

Systems and methods for expanding chat communication groups based on a chat context are provided. In an example, a chat and video conference provider establishes a first chat communication group for exchanging chat messages between a plurality of client devices and generates a chat summary for a subset of the chat messages within the first chat communication group. The chat and video conference provider determines a relevant user of the first chat communication group based on the chat summary and provides a recommendation for inviting the relevant user a second chat communication group. The chat and video conference provider establishes the second chat communication group and presents the chat summary in the second chat communication group in response to the relevant user joining the second chat communication group.

17 Claims, 16 Drawing Sheets

EXPANDING ONLINE CHAT COMMUNICATIONS BASED ON CHAT CONTEXT

FIELD

The present application generally relates to online chat communications, and more particularly relates to systems and methods for expanding chat communication groups based on the chat context.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

DETAILED DESCRIPTION

Figure 1:
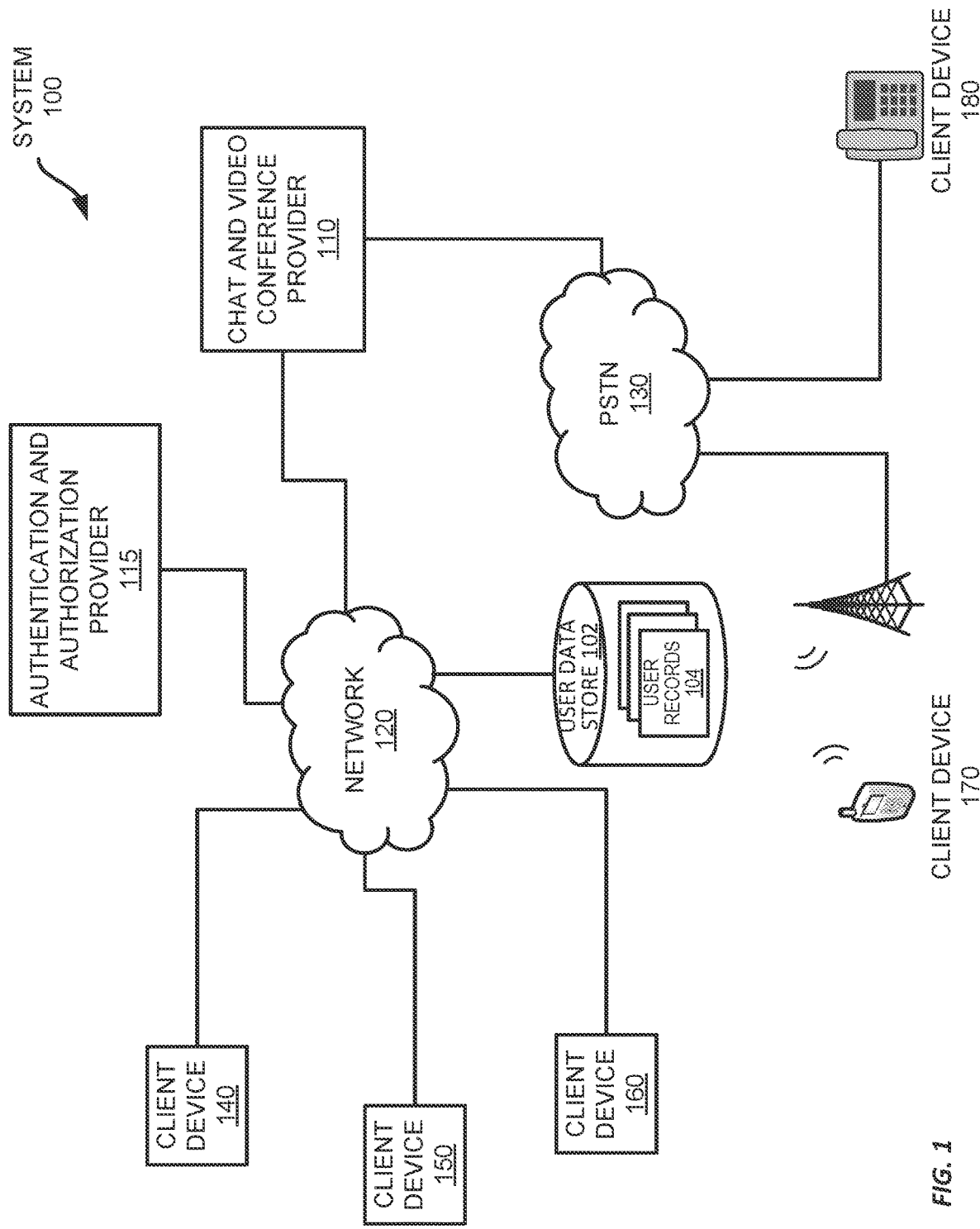
FIG. 1 shows an example system for expanding chat communication groups based on chat context, according to certain aspects of the present disclosure.

Examples are described herein in the context of systems and methods for expanding online chat communication groups based on the chat context. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Chat messaging has become a fixture of modern communication. In particular, chat messaging is used across numerous platforms, especially within work environments as a means of providing swift and easy communication between individuals. Chat messaging involves an application that allows multiple participants to exchange messages, including sharing documents, text messages, audio clips, images, video clips, etc., with other parties of the chat communication. Chat messaging may be carried out through mechanisms such as a one-on-one chat between two users, a group chat among two or more users, or a chat channel that is created for a specific topic and can be joined by users. These chat messaging mechanisms are collectively referred to herein as "chat communication groups" (or a "chat groups" in short). Parties in a chat communication group are also referred to herein as "users" or "members" of the chat communication group.

Members of a chat communication group may discuss, through chat messages, a variety of topics that might be relevant to other uses not in the chat communication group. These relevant users may be unknown to the existing members of the chat communication group, especially in a large organization. As a result, those users cannot join the chat communication group thereby causing the chat communication ineffective. In addition, even if a relevant user can be identified, as this new user joins the chat communication group, it is cumbersome for this new user to identify relevant or important information within the chat communication group as a large volume of messages might have been accumulated in the chat communication group.

To solve the above problems associated with existing chat messaging mechanisms, example systems and methods for intelligently expanding chat communication groups based on the context of the chat are provided herein. As described herein, a chat and video conference provider can utilize a machine learning model trained to generate a summary for chat messages in a chat communication group from time to time. The chat messages can include any information shared among the chat group members, such as text, files, links, etc. The machine learning model can be a model trained to accept a group of chat messages as input and output a chat summary for the group of chat messages.

In some examples, the chat summary model is trained based on a pre-trained model using training data samples. Each of the training data samples can include a group of input chat messages and a corresponding chat summary. The chat summary can be generated by applying a master machine learning model that is more complex, resource and time consuming, and accurate than the chat summary model to the group of input chat messages. The parameters of the chat summary model obtained through training are further quantized to reduce the number of bits used to represent each parameter and speed up the generation process. The chat summary model with the quantized parameters is used to generate chat summaries for chat messages.

Based on the generated summary, the chat and video conference provider can compare the topics or keywords in the summary with user data describing users within the organization to identify relevant users to be invited to the chat communication group. For example, the chat and video conference provider can determine, from the summary, that the content of the chat messages matches the interest or expertise of another user within the organization. Such a user can be identified as a relevant user to be invited to the chat communication group. In other examples, the relevant user might be determined through explicit identification in the chat messages.

As an invited relevant user or a new user joins the chat communication group, the chat and video conference provider can determine the chat summaries to be presented to the newly joined user so that the new user does not need to go over the past messages one by one. Alternatively, or additionally, the chat and video conference provider may suggest creating a new chat communication group for the existing users and adding the new user. The summaries generated based on the chat messages in the existing chat communication group can be selected and presented to the members of the new chat communication group to help them to get familiar with the discussion. The above process can be repeated for any chat communication group to expand the chat communication.

As described herein, certain embodiments provide improvements to online chat communications by solving problems that are specific to online platforms. These improvements include more effectively and efficiently identifying relevant users to the chat communication group based on the contextual clues from the discussion in a chat communication group and creating new chat communication groups. The improvements further include providing relevant summaries of previous chat messages to allow the new members to get familiar with the discussion quickly. These improvements allow the chat communication groups to achieve the goal of the discussion faster, thereby reducing the amount of time and the computing and network resources spent on the chat communication.

This illustrative example is given to introduce the reader to the general subject matter discussed herein and the disclosure is not limited to this example. The following sections describe various additional non-limiting examples and examples of systems and methods for expanding chat communication groups based on the chat context.

Referring now to FIG. 1, FIG. 1 shows an example system 100 that provides videoconferencing functionality to various client devices. The system 100 includes a chat and video conference provider 110 that is connected to multiple communication networks 120, 130, through which various client devices 140-180 can participate in video conferences hosted by the chat and video conference provider 110. For example, the chat and video conference provider 110 can be located within a private network to provide video conferencing services to devices within the private network, or it can be connected to a public network, e.g., the internet, so it may be accessed by anyone. Some examples may even provide a hybrid model in which a chat and video conference provider 110 may supply components to enable a private organization to host private internal video conferences or to connect its system to the chat and video conference provider 110 over a public network.

The system optionally also includes one or more authentication and authorization providers, e.g., authentication and authorization provider 115, which can provide authentication and authorization services to users of the client devices 140-160. Authentication and authorization provider 115 may authenticate users to the chat and video conference provider 110 and manage user authorization for the various services provided by chat and video conference provider 110. In this example, the authentication and authorization provider 115 is operated by a different entity than the chat and video conference provider 110, though in some examples, they may be the same entity.

Figure 2:
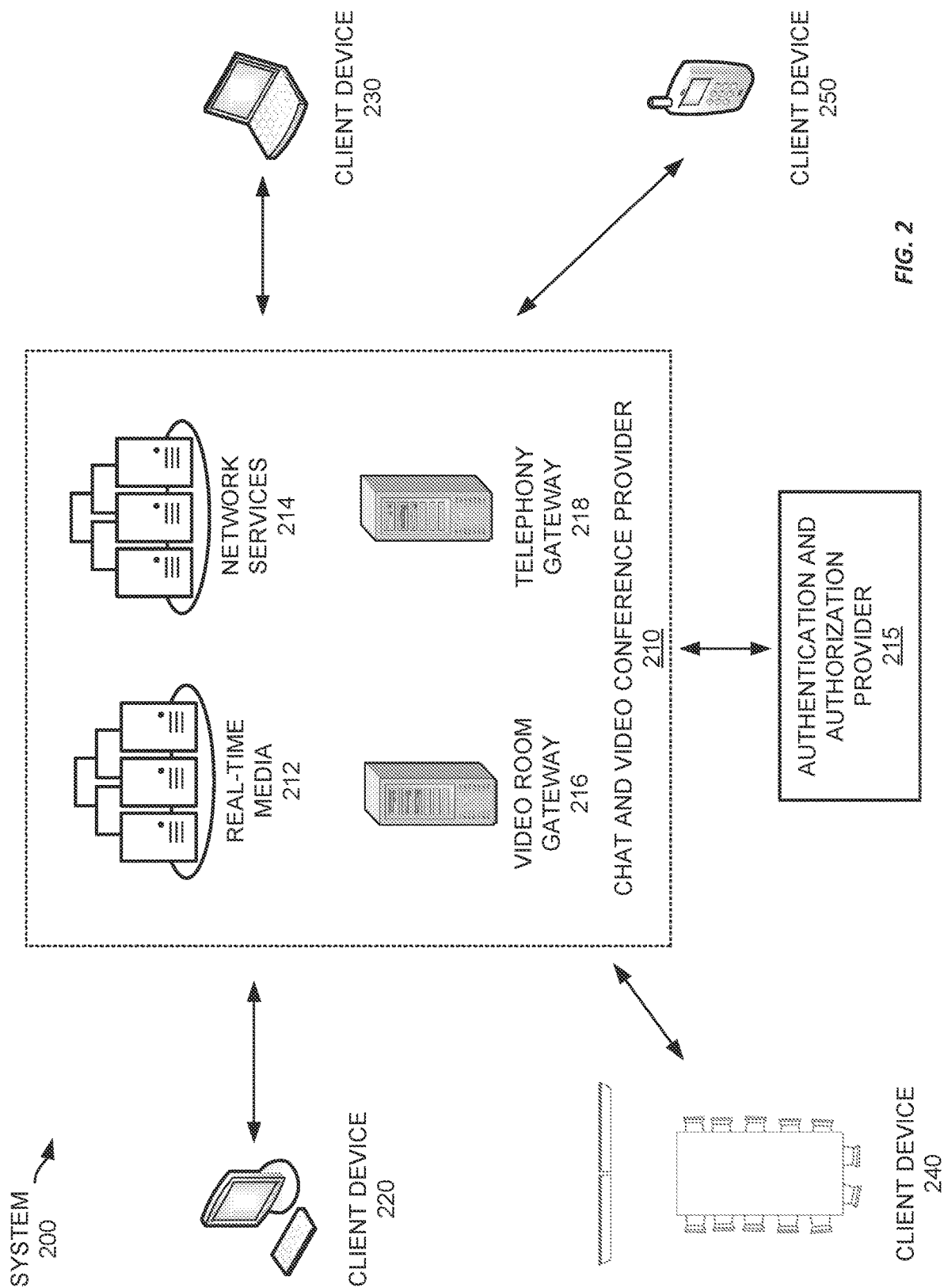
FIG. 2 shows an example system in which a chat and video conference provider provides videoconferencing and chat functionality to various client devices, according to certain aspects of the present disclosure.

Chat and video conference provider 110 allows clients to create videoconference meetings (or "meetings") and invite others to participate in those meetings as well as perform other related functionality, such as recording the meetings, generating transcripts from meeting audio, generating summaries and translations from meeting audio, manage user functionality in the meetings, enable text messaging during the meetings, create and manage breakout rooms from the virtual meeting, etc. FIG. 2, described below, provides a more detailed description of the architecture and functionality of the chat and video conference provider 110. It should be understood that the term "meeting" encompasses the term "webinar" used herein.

Meetings in this example chat and video conference provider 110 are provided in virtual rooms to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference may be used.

To create a meeting with the chat and video conference provider 110, a user may contact the chat and video conference provider 110 using a client device 140-180 and select an option to create a new meeting. Such an option may be provided in a webpage accessed by a client device 140-160 or a client application executed by a client device 140-160. For telephony devices, the user may be presented with an audio menu that they may navigate by pressing numeric buttons on their telephony device. To create the meeting, the chat and video conference provider 110 may prompt the user for certain information, such as a date, time, and duration for the meeting, a number of participants, a type of encryption to use, whether the meeting is confidential or open to the public, etc. After receiving the various meeting settings, the chat and video conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The video conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating that the meeting has not yet started, or the host may be required to specifically admit one or more of the users.

During the meeting, the participants may employ their client devices 140-180 to capture audio or video information and stream that information to the chat and video conference provider 110. They also receive audio or video information from the chat and video conference provider 110, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting, and they will no longer receive audio or video streams for the meeting (and will stop transmitting audio or video streams). The chat and video conference provider 110 may also invalidate the meeting information, such as the meeting identifier or password/passcode.

To provide such functionality, one or more client devices 140-180 may communicate with the chat and video conference provider 110 using one or more communication networks, such as network 120 or the public switched telephone network ("PSTN") 130. The client devices 140-180 may be any suitable computing or communication devices that have audio or video capability. For example, client devices 140-160 may be conventional computing devices, such as desktop or laptop computers having processors and computer-readable media, connected to the chat and video conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a video conference meeting hosted by the chat and video conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the chat and video conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can make conventional telephone calls and are not limited solely to dedicated telephony devices like conventional telephones.

Referring again to client devices 140-160, these devices 140-160 contact the chat and video conference provider 110 using network 120 and may provide information to the chat and video conference provider 110 to access functionality provided by the chat and video conference provider 110, such as access to create new meetings or join existing meetings. To do so, the client devices 140-160 may provide user authentication information, meeting identifiers, meeting passwords or passcodes, etc. In examples that employ an authentication and authorization provider 115, a client device, e.g., client devices 140-160, may operate in conjunction with an authentication and authorization provider 115 to provide authentication and authorization information or other user information to the chat and video conference provider 110.

An authentication and authorization provider 115 may be any entity trusted by the chat and video conference provider 110 that can help authenticate a user to the chat and video conference provider 110 and authorize the user to access the services provided by the chat and video conference provider 110. For example, a trusted entity may be a server operated by a business or other organization with whom the user has created an account, including authentication and authorization information, such as an employer or trusted third-party. The user may sign into the authentication and authorization provider 115, such as by providing a username and password, to access their account information at the authentication and authorization provider 115. The account information includes information established and maintained at the authentication and authorization provider 115 that can be used to authenticate and facilitate authorization for a particular user, irrespective of the client device they may be using. An example of account information may be an email account established at the authentication and authorization provider 115 by the user and secured by a password or additional security features, such as single sign-on, hardware tokens, two-factor authentication, etc. However, such account information may be distinct from functionality such as email. For example, a health care provider may establish accounts for its patients. And while the related account information may have associated email accounts, the account information is distinct from those email accounts.

Thus, a user's account information relates to a secure, verified set of information that can be used to authenticate and provide authorization services for a particular user and should be accessible only by that user. By properly authenticating, the associated user may then verify themselves to other computing devices or services, such as the chat and video conference provider 110. The authentication and authorization provider 115 may require the explicit consent of the user before allowing the chat and video conference provider 110 to access the user's account information for authentication and authorization purposes.

Once the user is authenticated, the authentication and authorization provider 115 may provide the chat and video conference provider 110 with information about services the user is authorized to access. For instance, the authentication and authorization provider 115 may store information about user roles associated with the user. The user roles may include collections of services provided by the chat and video conference provider 110 that users assigned to those user roles are authorized to use. Alternatively, more or less granular approaches to user authorization may be used.

When the user accesses the chat and video conference provider 110 using a client device, the chat and video conference provider 110 communicates with the authentication and authorization provider 115 using information provided by the user to verify the user's account information. For example, the user may provide a username or cryptographic signature associated with an authentication and authorization provider 115. The authentication and authorization provider 115 then either confirms the information presented by the user or denies the request. Based on this response, the chat and video conference provider 110 either provides or denies access to its services, respectively.

For telephony devices, e.g., client devices 170-180, the user may place a telephone call to the chat and video conference provider 110 to access video conference services. After the call is answered, the user may provide information regarding a video conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the chat and video conference provider 110. For example, telephony devices may be unable to provide authentication information to authenticate the telephony device or the user to the chat and video conference provider 110. Thus, the chat and video conference provider 110 may provide more limited functionality to such telephony devices. For example, the user may be permitted to join a meeting after providing meeting information, e.g., a meeting identifier and passcode, but only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide account information to the chat and video conference provider 110, even in cases where the user could authenticate and employs a client device capable of authenticating the user to the chat and video conference provider 110. The chat and video conference provider 110 may determine whether to allow such anonymous users to use services provided by the chat and video conference provider 110. Anonymous users, regardless of the reason for anonymity, may be restricted as discussed above with respect to users employing telephony devices, and in some cases may be prevented from accessing certain meetings or other services, or may be entirely prevented from accessing the chat and video conference provider 110.

Referring again to chat and video conference provider 110, in some examples, it may allow client devices 140-160 to encrypt their respective video and audio streams to help improve privacy in their meetings. Encryption may be provided between the client devices 140-160 and the chat and video conference provider 110 or it may be provided in an end-to-end configuration where multimedia streams (e.g., audio or video streams) transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the chat and video conference provider 110, while allowing the chat and video conference provider 110 to access the decrypted multimedia streams to perform certain processing, such as recording the meeting for the participants or generating transcripts of the meeting for the participants. End-to-end encryption may be used to keep the meeting entirely private to the participants without any worry about a chat and video conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus, the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the chat and video conference provider 110. Further, such a system enables users to use a wide variety of different client devices 140-180 from traditional standards-based video conferencing hardware to dedicated video conferencing equipment to laptop or desktop computers to handheld devices to legacy telephony devices, etc.

The chat and video conference provider 110 allows clients to start various chat communications to exchange chat messages, including sharing text messages, documents, images, video clips, audio clips, etc. The chat communications can be performed through a one-on-one chat between two users, a group chat among multiple users, or a chat channel. Chat channels allow private or public groups to be created where a member can send messages, files, images, and start an instant meeting with channel members. These channels generally serve as longer-term collaboration forums, such as specific teams, channels serving a specific purpose or topic (Ask IT, for example), and announcement channels. In some examples, a chat channel can be a private chat channel or a public chat channel. Private channels cannot be searched for and found by users who are not already a member of the channel; current members of the channel can add those other members to give them access. Public channels can be made searchable and joinable by all members of an organization, and all members of the organization need no special invitation to join, but they can be added to the channel by current members as well.

In some examples, the chat and video conference provider 110 can be configured to be in communication with a user data store 102. The user data store 102 can be configured to store information related to the individuals of an organization. For example, the database can store user records 104 for each member of the organization. The user records 104 can contain information about various aspects of the member, such as the name, gender, location, job title, job description, interest, expertise, and so on. The information stored in the user data store 104 can be provided by the organization and/or obtained from a third-party system, such as LinkedIn® or Facebook®. The user data store 104 can be used by the chat and video conference provider 110 to identify relevant users for chat channels. The user data store 102 may be co-located with the chat and video conference provider 110 or accessible by the chat and video conference provider 110 through a network, such as network 120.

While FIG. 1 shows a single system for the chat and video conference provider 110, the functionality of the chat and video conference provider 110 may be implemented in separate systems, such as one system for the chat functionality and one for the meeting functionality. Other configurations of the chat and video conference provider 110 may be possible.

Referring now to FIG. 2, FIG. 2 shows an example system 200 in which a chat and video conference provider 210 provides videoconferencing functionality to various client devices 220-250. The client devices 220-250 include two conventional computing devices 220-230, dedicated equipment for a video conference room 240, and a telephony device 250. Each client device 220-250 communicates with the chat and video conference provider 210 over a communications network, such as the internet for client devices 220-240 or the PSTN for client device 250, generally as described above with respect to FIG. 1. The chat and video conference provider 210 is also in communication with one or more authentication and authorization providers 215, which can authenticate various users to the chat and video conference provider 210 generally as described above with respect to FIG. 1.

In this example, the chat and video conference provider 210 employs multiple different servers (or groups of servers) to provide different examples of video conference functionality, thereby enabling the various client devices to create and participate in video conference meetings. The chat and video conference provider 210 uses one or more real-time media servers 212, one or more network services servers 214, one or more video room gateways 216, one or more message and presence gateways 217, and one or more telephony gateways 218. Each of these servers 212-218 is connected to one or more communications networks to enable them to collectively provide access to and participation in one or more video conference meetings to the client devices 220-250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the chat and video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed stream to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead, each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the chat and video conference provider 210. In some such examples, the real-time media servers 212 may decrypt incoming multimedia streams, multiplex the multimedia streams appropriately for the various clients, and encrypt the multiplexed streams for transmission.

As mentioned above with respect to FIG. 1, the chat and video conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the chat and video conference provider 210 may allow a meeting participant to notify it of inappropriate behavior or content in a meeting. Such a notification may trigger the real-time media servers to 212 record a portion of the meeting for review by the chat and video conference provider 210. Still other functionality may be implemented to take actions based on the decrypted multimedia streams at the chat and video conference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the chat and video conference provider 210 via local servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the video conference system and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the chat and video conference provider under a supervisory set of servers. When a client device 220-250 accesses the chat and video conference provider 210, it will typically communicate with one or more network services servers 214 to access their account or to participate in a meeting.

When a client device 220-250 first contacts the chat and video conference provider 210 in this example, it is routed to a network services server 214. The client device may then provide access credentials for a user, e.g., a username and password or single sign-on credentials, to gain authenticated access to the chat and video conference provider 210. This process may involve the network services servers 214 contacting an authentication and authorization provider 215 to verify the provided credentials. Once the user's credentials have been accepted, and the user has consented, the network services servers 214 may perform administrative functionality, like updating user account information, if the user has account information stored with the chat and video conference provider 210, or scheduling a new meeting, by interacting with the network services servers 214. Authentication and authorization provider 215 may be used to determine which administrative functionality a given user may access according to assigned roles, permissions, groups, etc.

In some examples, users may access the chat and video conference provider 210 anonymously. When communicating anonymously, a client device 220-250 may communicate with one or more network services servers 214 but only provide information to create or join a meeting, depending on what features the chat and video conference provider allows for anonymous users. For example, an anonymous user may access the chat and video conference provider using client device 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, assigning or moving users to the mainstage or a breakout room if present, recording meetings, etc. Such functionality may be managed by the network services server(s) 214.

For example, if a host wishes to remove a user from a meeting, they may select a user to remove and issue a command through a user interface on their client device. The command may be sent to a network services server 214, which may then disconnect the selected user from the corresponding real-time media server 212. If the host wishes to remove one or more participants from a meeting, such a command may also be handled by a network services server 214, which may terminate the authorization of the one or more participants for joining the meeting.

In addition to creating and administering on-going meetings, the network services server(s) 214 may also be responsible for closing and tearing-down meetings once they have been completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the chat and video conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the chat and video conference provider 210. For example, the video conferencing hardware may be provided by the chat and video conference provider to one or more of its subscribers, which may provide access credentials to the video conferencing hardware to use to connect to the chat and video conference provider 210.

The video room gateway servers 216 provide specialized authentication and communication with the dedicated video conferencing hardware that may not be available to other client devices 220-230, 250. For example, the video conferencing hardware may register with the chat and video conference provider when it is first installed and the video room gateway may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the chat and video conference provider 210.

Referring now to the telephony gateway servers 218, these servers 218 enable and facilitate telephony devices' participation in meetings hosted by the chat and video conference provider 210. Because telephony devices communicate using the PSTN and not using computer networking protocols, such as TCP/IP, the telephony gateway servers 218 act as an interface that converts between the PSTN, and the networking system used by the chat and video conference provider 210.

For example, if a user uses a telephony device to connect to a meeting, they may dial a phone number corresponding to one of the chat and video conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio streams to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server is instead joined to the meeting on the telephony device's behalf.

After joining the meeting, the telephony gateway server 218 receives an audio stream from the telephony device and provides it to the corresponding real-time media server 212 and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the chat and video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

In some embodiments, in addition to the video conferencing functionality described above, the chat and video conference provider 210 (or the chat and video conference provider 110) may provide a chat functionality, such as through one or more chat management servers (not shown in FIG. 2). The chat management servers may be the same servers as the real-time media servers (that is, the real-time media servers implementing the functionality of the chat management) or separate servers. In such examples, the chat and video conference provider 210 may allow a user to create one or more chat communication groups where the user may exchange messages with other users that have access to the chat communication groups. The messages may include text, image files, video files, or other files. In some examples, a chat communication group may be "open," meaning that any user may access the chat channel. In other examples, the chat communication group may require that a user be granted permission to access the chat communication group. The chat and video conference provider 210 may provide permission to a user and/or a host of the chat communication group may provide permission to the user. Furthermore, there may be any number of members permitted in the chat communication group.

Similar to the formation of a meeting, a chat communication group may be provided by the chat management servers where messages exchanged between members of the chat communication group are received and then directed to respective client devices. For example, if the client devices 220-250 are part of the same chat communication group, messages may be exchanged between the client devices 220-240 via the chat and video conference provider 210 in a manner similar to how a meeting is hosted by the chat and video conference provider 210.

Figure 3:
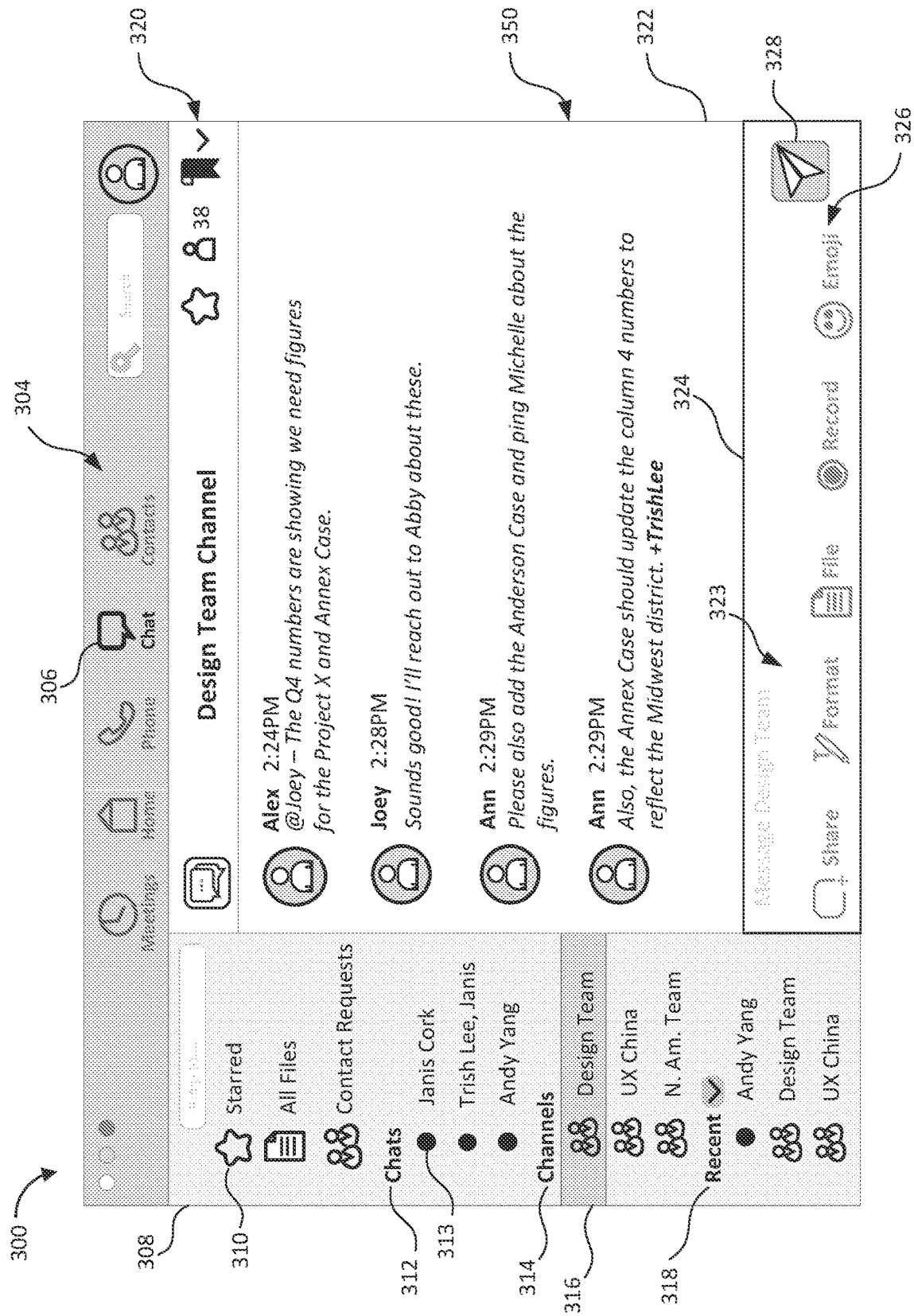
FIG. 3 illustrates an example of a user interface presenting chat communication groups, according to certain aspects of the present disclosure.

Referring now to FIG. 3, FIG. 3 shows a graphical user interface ("GUI") for a master chat panel 300 provided as a part of client software executed by a computing device. The master chat panel 300 provides access to a variety of chat functionality, including multiple chat channels 314 the user has access to. It also provides a view of an example chat channel 316, according to an embodiment herein. The chat channel 316 may be accessible through the master chat panel 300 by selecting a chat channel from the available chat channels. The master chat panel 300 may be displayed on a client device, such as the client device 220, in response to information sent by a chat and video conference provider, such as the chat and video conference provider 110 in FIG. 1. The master chat panel 300 may be generated by an application, e.g., a standalone chat client or integrated into a video conferencing application, run by one or more processors stored on the client device.

The master chat panel 300 may include a general dashboard 304, a chat control dashboard 320, a sidebar 308, a chat window 350, a reply dashboard 326, and a message composure panel 324. The general dashboard 304 may include one or more buttons or links that switch functionalities and/or views of the master chat panel 300. For example, FIG. 3 shows a chat view, for example, in response to a user command selecting a chat button 306 in the general dashboard 304. In this view, the chat window 350, the message composure panel 324, and other components illustrated in FIG. 3 may be displayed on the client device. In other examples, a contacts button may be selected by a user. In response the contacts button being selected, the chat window 350, the reply dashboard 326 and the message composure panel 324 may be replaced by a display of a contacts window including a list of user contacts associated with the user of the client device. The sidebar 308 may be displayed alongside the contacts window. Other configurations are also possible. Various buttons on the general dashboard 304 may correspond to various displays of windows being displayed on the client device. Any number of components shown in FIG. 3 may be displayed on the client device with any of the various windows. Similarly, any of the components may cease to be displayed in accordance with any of the windows.

The sidebar 308 may include one or more chat related headings, such as chats 312, channels 314, and recent 318. Chats 312 heading may include one-on-one chats or group chats, such as one-on-one chat 313 between the user viewing the master chat panel 300 and one other member, such as Janis Cork, as depicted. Messages exchanged via the chat 313 may only be accessible by the user and the other members in the chat. One-on-one chat, such as those provided under the chats 312 heading may allow members to securely communicate with each other or track communications between themselves. Chats 312 heading also lists a group chat among the user, Trish Lee, and Janis Cork. A group chat may include two or more members. In some examples, the group chat may only be accessed by members who have permission to enter the group chat, such as members who receive and accept an invitation to join the group chat. In some embodiments, a group chat may have a host or member who has host controls over the group chat. For example, host controls may include the ability to establish and invite members to a group chat.

The channels 314 heading are for chat channels such as the chat channel 316 for a Design Team. The chat channel 316 may include two or more members who have access to send and receive messages within the chat channel 316. In some examples, the chat channel 316 may only be accessed by members who have permission to enter the chat channel 316, such as members who receive and accept an invitation to join the chat channel 316. In some embodiments, a chat channel may have a host or member who has host controls over the chat channel. For example, host controls may include the ability to establish and invite members to a chat channel.

The recent 318 heading may indicate chat communication groups that the user has recently viewed. The recent 318 heading may allow the user easy access to commonly or recently viewed or accessed chat communication groups. "Recently accessed" chat communication groups may be determined by the client device to be a fixed number of most recent chat communication groups accessed by the user or may be only those chat communication groups access within a certain time, calculated from the current time.

Although only the chat group headings 312, 314, and 318 are shown, other chat group headings are possible. For example, some examples may include a chat group heading that displays, on the client device, only those chat groups that the user associated with the client device is a member of that have been recently accessed.

The sidebar 308 may also include one or more combinatory headings, such as starred combinatory heading 310. A combinatory heading may aggregate one or more messages from one or more chat channels, according to a predetermined criterion. The combinatory headings may include a link that, in response to a user command, cause the client device to display one or more messages in the chat window 350. The messages may be gathered from one or more chat channels, such as the chat channels 312 or 316, and displayed based on predetermined criteria. In FIG. 3, for example, the starred combinatory heading 310 may gather only those messages that have been marked by a user of the client device. The marked messages may be stored at the client device, and/or may be stored at the chat and video conference provider. The link may cause the one or more processors included on the client device to determine which messages are marked messages and cause them to be displayed in the chat window 350. In some examples, the link may cause the client device to send a signal to the chat and video conference provider. The chat and video conference provider may then determine which messages are marked messages and send information to the client device to generate a display of the marked messages in the chat window 350.

Other combinatory headings (and associated links and functionality) are also considered. Other examples may include an unread heading, an all files heading, a contact request heading, and others. As with the starred combinatory heading 310, an associated link may cause the client device and/or the chat and video conference provider to determine which messages (if any) meet predetermined criteria associated with the combinatory heading and subsequently display those messages on the client device.

As depicted, the user may select to access the chat channel 316 for the Design Team. Upon selection of the chat channel 316, the chat window 350 may be provided on the master chat panel 300. The chat window 350 may include the chat control dashboard 320. The chat control dashboard 320 may display one or more control buttons and/or information regarding the chat channel 316 (e.g., the currently viewed chat channel). The control buttons may include links that mark a message (e.g., to mark it such that it is determined to be a marked message via the starred combinatory heading 310), begin a video conference, schedule a meeting, create a video message, or other tasks. The chat control dashboard 320 may also include a title of the chat channel 316 currently being displayed on the client device, such as the "Design Team Channel" as depicted, and/or a number of users with access to the chat channel 316. One of ordinary skill in the art would recognize many different possibilities and configurations.

The chat window 350 may also include a message composure panel 324. The message composure panel 324 may include an input field 323, where the member can input a message and select to send the message to the chat channel 316. The input field 323 may be accessed by a peripheral device such as a mouse, a keyboard, a stylus, or any other suitable input method. In some examples, the input field 323 may be accessed by a touchscreen or other system built into the client device. In some examples, a notification may be sent from the client device and/or the chat and video conference provider that indicates a response is being entered into the input field 323 by the user. In other examples, no notification may be sent.

The reply dashboard 326 may include one or more buttons that, in response to a user command edit or modify a response input into the input field 323. For example, a record button may be provided, that allows the client device to capture audio and video. In other examples, there may be a share button that causes the client device to send the message to a different chat channel. In yet another example, there may be a reaction button that causes an image to be sent by the client device to the chat channel in response to a message posted in the chat channel.

In some examples, there may be one or more formatting buttons included on the reply dashboard 326. The one or more formatting buttons may change the appearance of a reply entered in the input field 323. The user may thereby edit and customize their response in the input field 323 before sending.

The reply dashboard 326 may include a send button 328. The send button 328 may, in response to a user command, cause the client device to send the contents of the input field 323 (or "message") to the other members of the chat channel 316. The client device may transmit the message to the chat and video conference provider 210, which may in turn transmit the message to the client devices associated with the other members of the chat channel 316. Upon transmission of the message via the send button 328, the message may be published within a chat messaging panel 322. As noted above, messages exchanged within the chat channel 316 may include image files, such as JPEG, PNG, TIFF, or files in any other suitable format, may also include video files such as MPEG, GIF, or video files in any other suitable format, or may also include text entered into the input field 323 and/or other files attached to the message such as a PDF, DOC, or other file format.

As illustrated, the chat window 350 may include the chat messaging panel 322. The chat messaging panel 322 may display messages as they are exchanged between members of the chat channel 316. The messages may be displayed in the chat messaging panel 322 in real-time. The chat messaging panel 322 may include all messages that are exchanged within the chat channel 316 since the generation of the chat channel 316. As could be appreciated, by holding all messages that are exchanged between members of the chat channel 316, the chat messaging panel 322 may include a large volume of messages. Not only could a large volume of messages be generated if the chat channel 316 is active for a long duration of time or includes a large number of members, but also if the members of the chat channel 316 are increasingly communicative.

Figure 4:
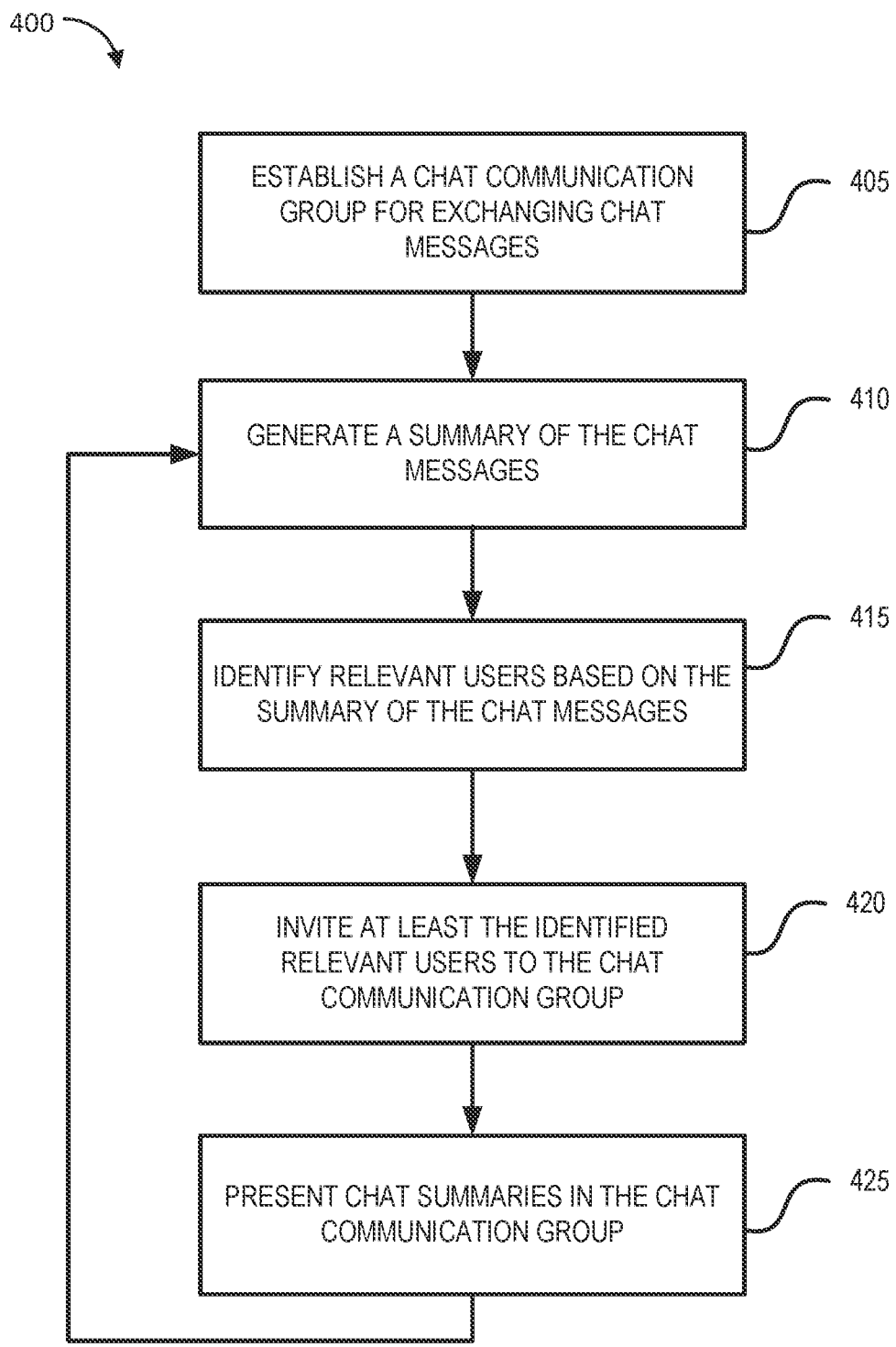
FIG. 4 shows a flowchart of an example process for identifying relevant users for a chat communication group based on chat context, according to certain aspects of the present disclosure.

Referring now to FIG. 4, FIG. 4 shows a flowchart of an example process 400 for identifying relevant users for a chat communication group based on chat context, according to certain aspects of the present disclosure. One or more computing devices (e.g., the chat and video conference provider 110) implement operations depicted in FIG. 4 by executing suitable program code. For illustrative purposes, the process 400 is described with reference to certain examples depicted in the figures. Other implementations, however, are possible.

At block 405, the process 400 involves establishing a chat communication group. For example, the chat and video conference provider 110 may establish a chat channel, a group chat, or a one-on-one chat. Users are able to exchange chat messages between each other within the chat communication group. In some examples, the chat messages include text and files, such as documents, images, video clips, audio clips, and so on.

At block 410, the process 400 involves the chat and video conference provider 110 generating a summary of the chat messages in the chat communication group. For example, the chat and video conference provider 110 can apply a machine learning model to the chat messages in the chat communication group. The machine learning model can be a language model trained to generate a text summary for text messages collected in a chat communication group. Depending on the configuration, the machine learning model can take the text messages as input to generate the text summary. Alternatively, or additionally, the machine learning model can be trained to take documents as input in addition to the text messages. Further, the chat and video conference provider 110 may generate or otherwise extract texts from non-text chat messages, such as extracting text from an image or generating text describing the content of the image, extracting transcript of an audio or video, and so on. The extracted texts from the non-text chat messages allow the machine learning model to be used to generate the chat summary. In some examples, the machine learning model is used to generate a chat summary for a portion of the chat messages in the chat communication group, such as chat messages in a conversation or in a past time period. Another chat summary can be generated for another portion of the chat messages. Additional details regarding training and using the machine learning model to generate chat summaries are provided below with regard to FIGS. 9-11.

Figure 5:
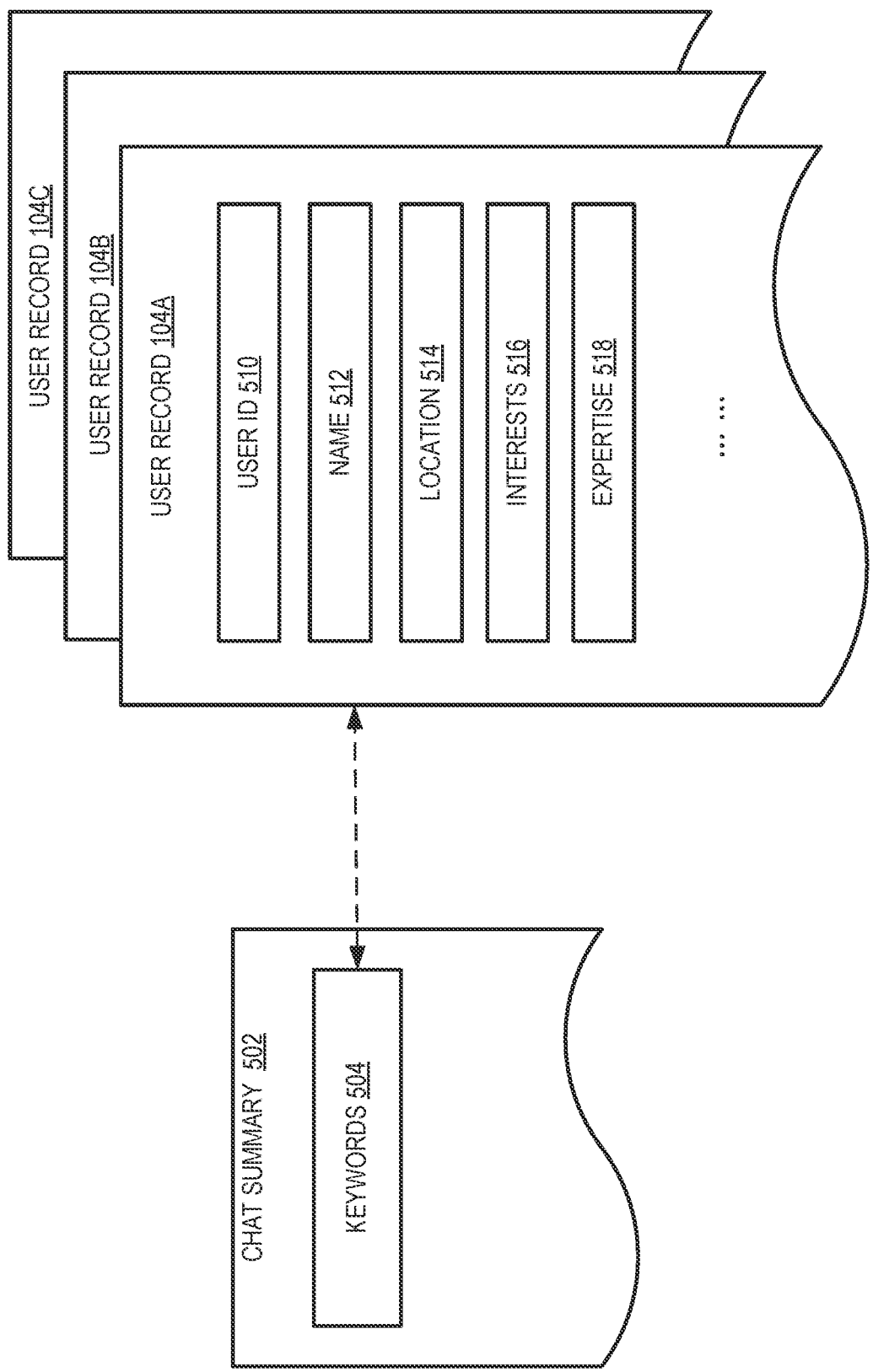
FIG. 5 shows an example of matching a chat summary with user records to identify a relevant user for a chat communication group, according to certain aspects of the present disclosure.

At block 415, the process 400 involves identifying relevant users to the chat communication group based on the chat summary. In some examples, identifying a relevant user can be performed by matching keywords or topics from the chat summary with user data in the user records 104. FIG. 5 illustrates an example of matching the chat summary with user records to identify a relevant user for a chat communication group. In this examples, one or more keywords 504 can be associated or extracted from the chat summary 502 generated at block 410. The keywords 504 may be generated along with the chat summary 502, such as by the machine learning model, or the chat and video conference provider 110 can use natural language processing techniques, such as named entity recognition, to extract information such as person names, organizations, time, locations from the chat summary 502 as keywords 504.

The chat and video conference provider 110 can find matches for each keyword in each of the user records 104A-104C. As illustrated in FIG. 5, a user record 104 for a user (e.g., a user in an organization) is uniquely identified by a user ID 510 and can include multiple fields describing the user, such as the name 512, location 514 (e.g., office location), interests 516, expertise 518, and so on. For a keyword 504, the chat and video conference provider 110 can search these fields of a user record to determine matches and repeat the search for other user records. The user record having the greatest number of keyword matches can be identified as the relevant user. In other examples, a user having the number of keyword matches exceeding a threshold value can be identified as a relevant user. In alternative or additional examples, the matching can be performed by extracting terms or keywords from each user record 104 and find matches of the extracted terms or keywords in the chat summary 502. Other ways to identify matches between the chat summary 502 and the user record 104 can be utilized.

In addition, the chat and video conference provider 110 can also identify the relevant user directly from the chat messages, such as through explicit identification or mentioning of the user. For instance, chat messages may tag a user using "@" or "+" symbol before that user's name, the chat and video conference provider 110 can search for the @ symbol or "+" symbol to identify the relevant user. Alternatively, or additionally, the chat and video conference provider 110 can use named entity recognition technology to extract person names from the chat messages and find users within the system or organization (e.g., using user data store 102) that match the extracted names.

Figure 6A:
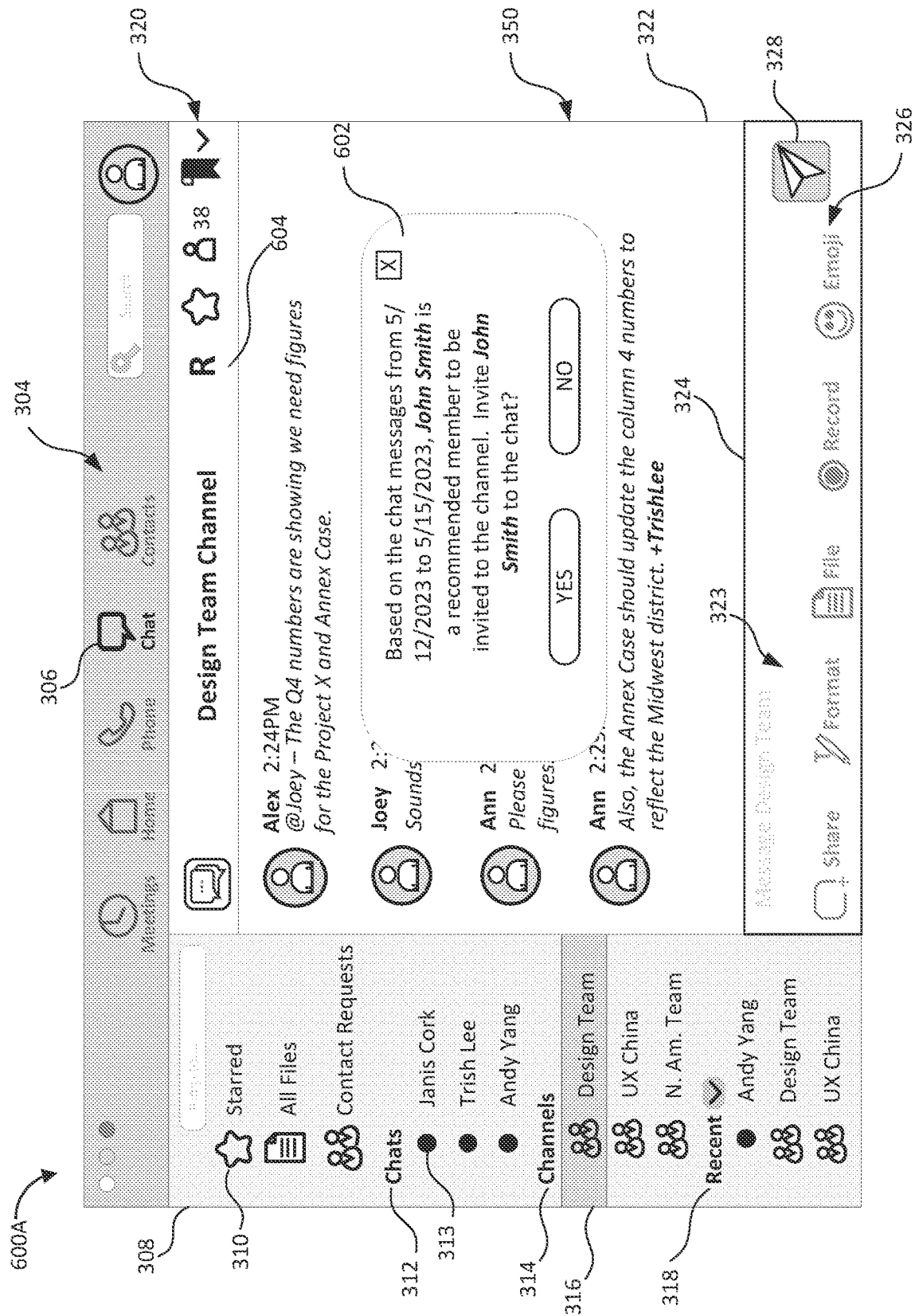
FIG. 6A shows an example of a user interface presented on a computing device associated with a host of a chat communication group for obtaining approval of inviting identified relevant users to join the chat communication group, according to certain aspects of the present disclosure.

Referring back to FIG. 4, at block 420, the process 400 involves inviting the identified relevant users to the chat communication group. In some examples, the invitation is sent to the identified relevant users at the approval of a host of the chat communication group. Such an approval can be obtained through a user interface presented on the computing device associated with the host of the chat communication group. FIG. 6A shows an example of such a user interface. The example user interface 600A shown in FIG. 6A is based on the example user interface 300 shown in FIG. 3. In this example, the chat and video conference provider 110 has identified, based on the chat messages exchanged during May 12, 2023, to May 15, 2023, that John Smith is a relevant user. As the chat messages have been focused on figures for project X and Annex Case, John Smith might be identified as a relevant user because his expertise or interest is related to figures and/or Annex Case. The chat and video conference provider 110 presents a message box 602 informing the host of the Design Team chat channel that John Smith has been identified as a relevant user and recommends inviting him to the chat channel. The host can approve the recommendation by clicking the "Yes" button and the chat and video conference provider 110 will invite the John Smith to the Design Team Channel. The host may decline the recommendation by clicking the "No" button and John Smith will not be invited to the chat channel. In the example shown in FIG. 6A, the user interface 600A also includes a user interface control 604 which when activated will display all the recommended users to be invited to the chat. This allows the host to accept or decline recommendations or change the approval decisions at a later time.

Figure 6B:
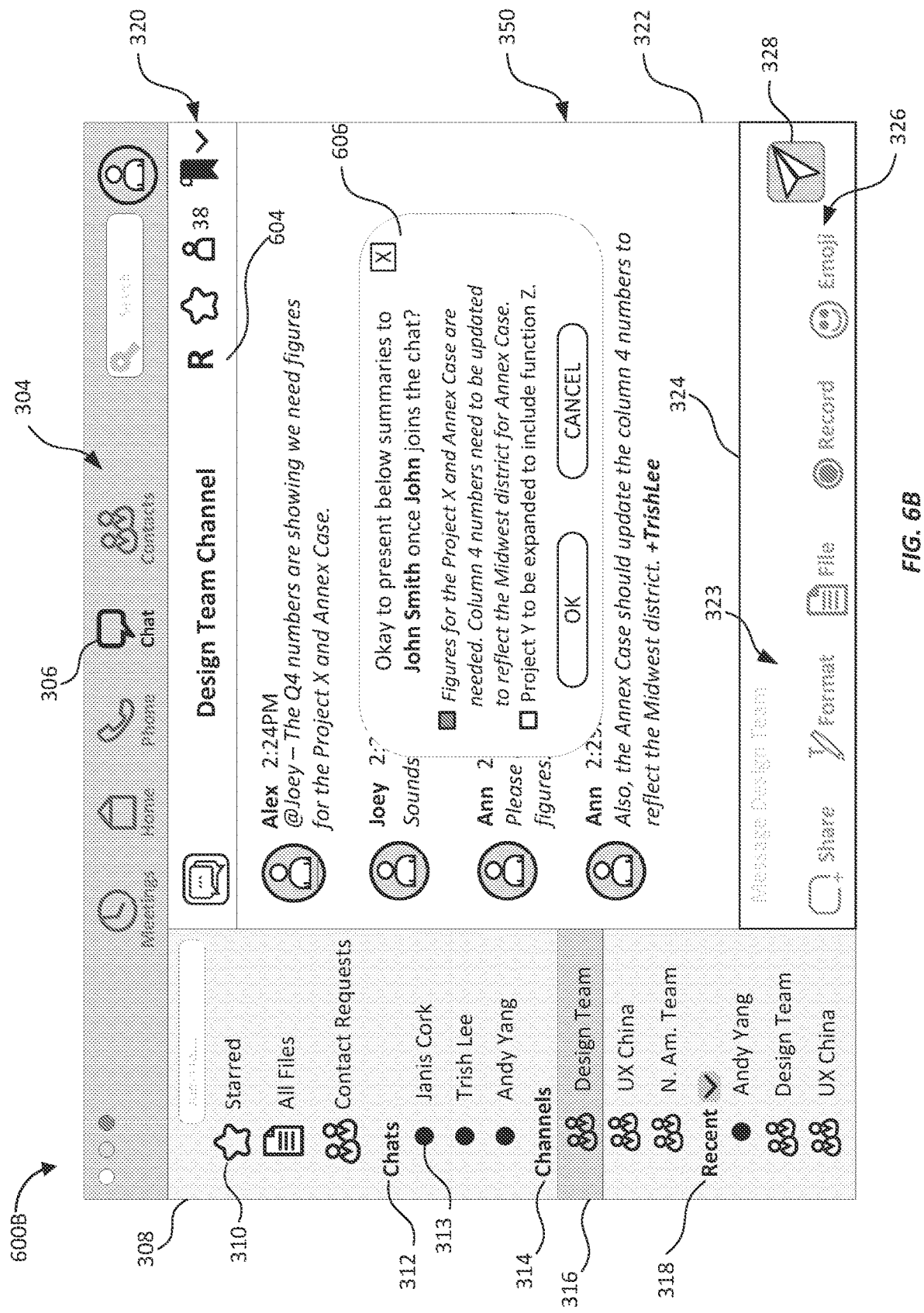
FIG. 6B shows an example of a user interface presented to the host of a chat communication group for selecting chat summaries to be displayed in the chat communication group after a new user joins the chat, according to certain aspects of the present disclosure.

Referring back to FIG. 4, at block 425, the process 400 involves presenting chat summaries in the chat communication group. Presenting chat summaries in the chat communication group allows the newly joined users to catch up with the discussion in the chat communication group quickly. In some examples, the chat summaries generated for the chat communication group are presented to the host of the chat communication group to allow the host to select the chat summaries that can be seen by the newly joined users. FIG. 6B shows an example of the user interface 600B presented to the host for selecting chat summaries. The example user interface 600B shown in FIG. 6B is based on the example user interface 600A shown in FIG. 6A. In this example, the chat and video conference provider 110 presents a message box 606 to ask the host to select the chat summaries to be presented to the new user of the chat communication group. The message box 606 may be presented after the host clicks the "Yes" button on the message box 602. The chat summaries listed in the message box 606 can include summaries in a predetermined past time period, such as in the past 2 weeks. Alternatively, or additionally, the listed chat summaries can be determined by the chat and video conference provider 110 as those summaries that are relevant to the new user, such as based on the user record of the user. The host can deselect the summaries that the host does not want the new user to see before clicking on the "OK" button to authorize the display of the chat summaries. In the example shown in FIG. 6B, the host has deselected the second recommended chat summary and only allows the first chat summary to be presented in the chat UI when the new user John Smith joins the chat.

Figure 6C:
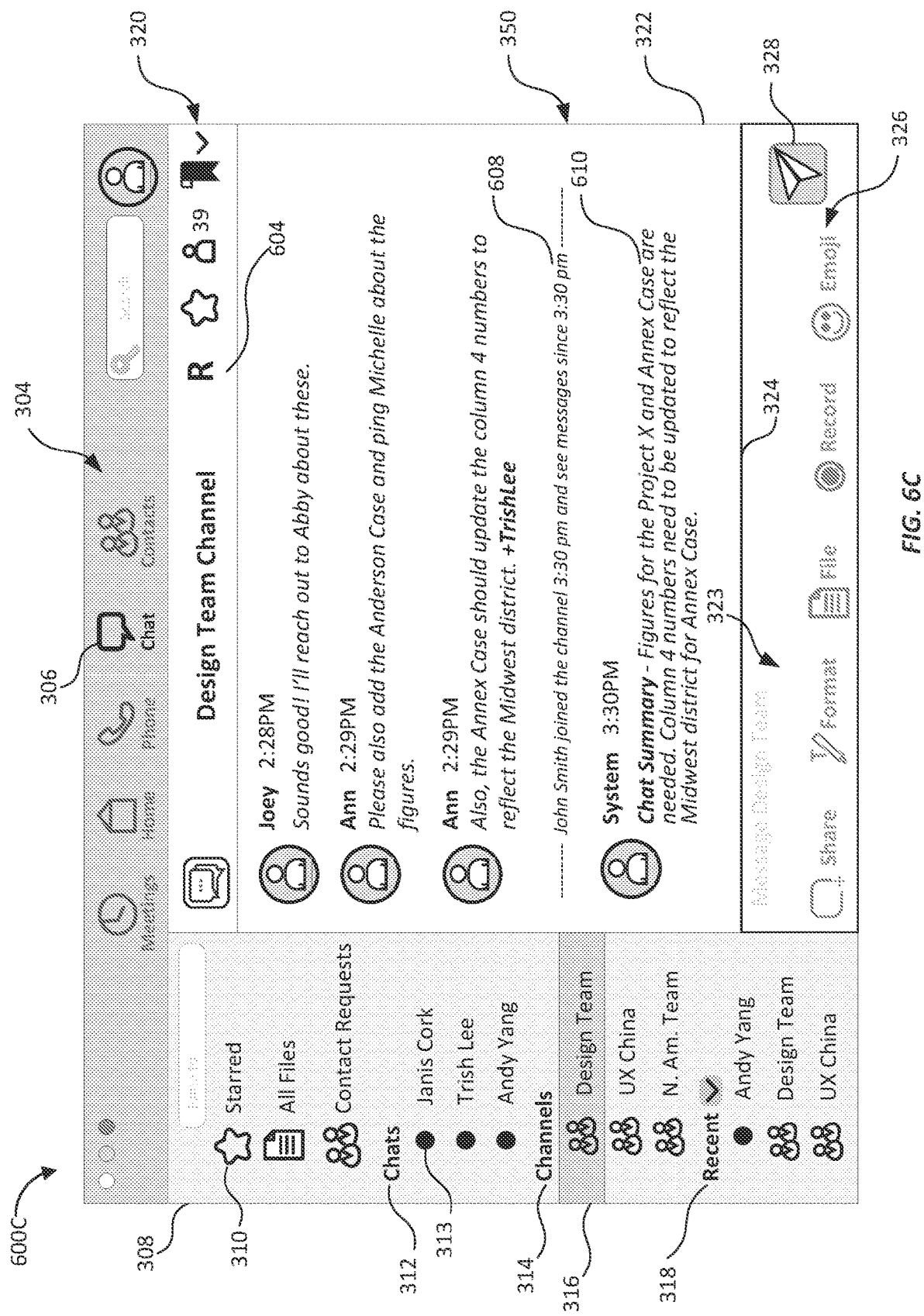
FIG. 6C shows an example of a user interface of a chat communication group after an identified relevant user joins the chat communication group, according to certain aspects of the present disclosure.

FIG. 6C shows an example of the user interface after a new user, John Smith in this example, joins the chat communication group. As shown in FIG. 6C, a notification 608 is shown in the chat messaging panel 322 indicating that the new user has joined and the timestamp of the joining event. The notification 608 further informs the existing users of the chat communication group what content is visible to the new user. Further, the chat summary 610 that has been approved by the host is also shown in the chat messaging panel 322 so that the new user, as well as existing users, is able to review it.

Referring back to FIG. 4, in addition to presenting the summary in the chat communication group, block 425 may also involve identifying and presenting messages in the historical (archived) conversation to the newly joined user. The user can trim these messages as appropriate. The chat and video conference provider 110 can identify different portions of the historical conversions for different users based on, for example, the user records. For example, the chat and video conference provider 110 can match the messages in the historical conversation with the respective user records 104A-104C to identify the messages to be presented to the respective newly joined users. The identified messages may be presented to the host of the chat communication group first to allow the host to select which participants can see which portion of the historical conversation. In addition, the host can also edit the identified messages before they are presented to the users.

The process 400 can repeat from block 410 where the chat and video conference provider 110 generates a chat summary for new chat messages posted since the generation of the last chat summary and identify new relevant users as discussed above. The example shown in FIG. 4 involves inviting a new user to an existing chat communication group. In other examples, the identifying a relevant user can trigger the creation of a new chat communication group.

Figure 7:
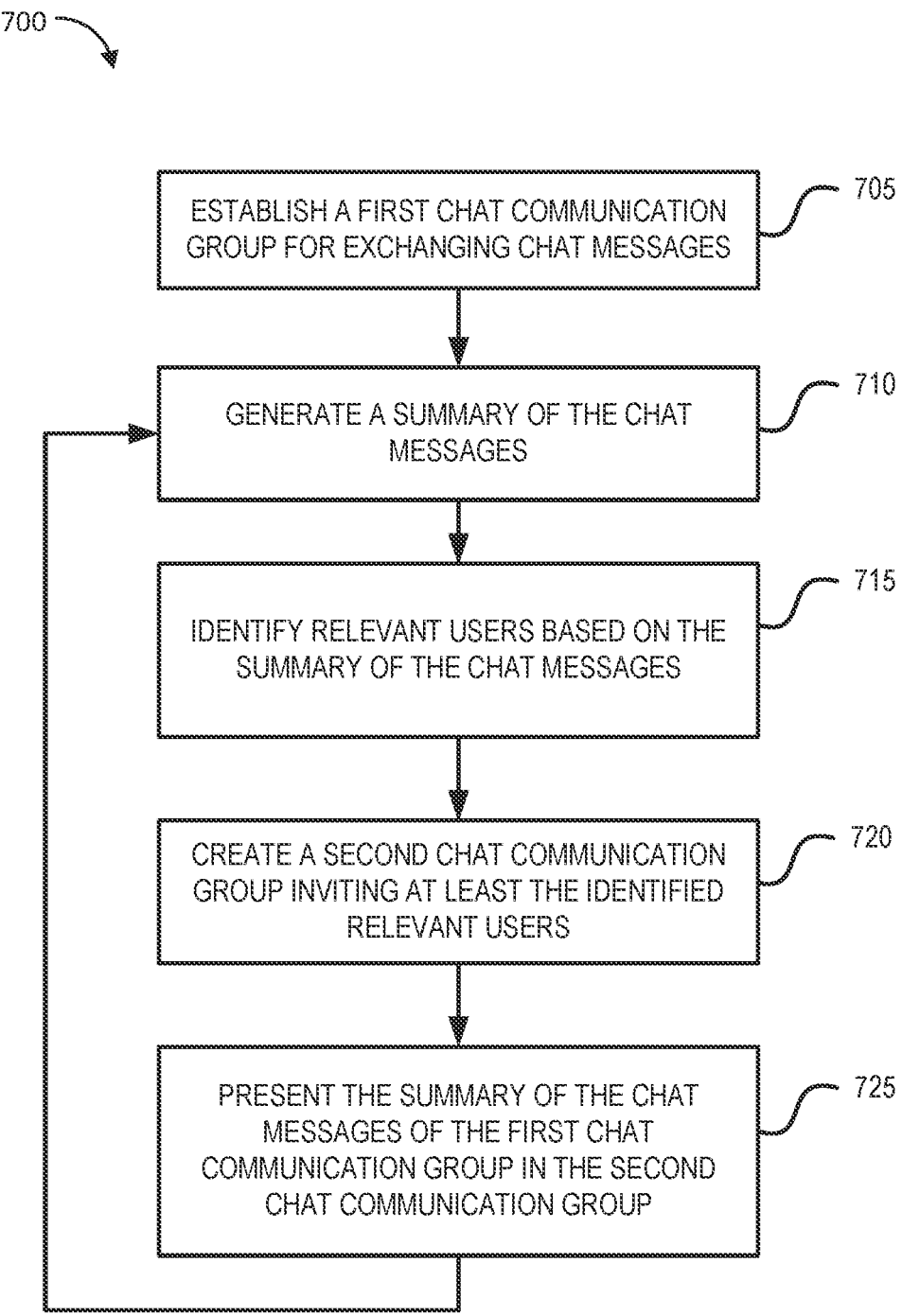
FIG. 7 shows a flowchart of an example process for identifying relevant users for a chat communication group based on chat context and creating a new chat communication group, according to certain aspects of the present disclosure.

FIG. 7 shows a flowchart of an example process 700 for identifying relevant users for a chat communication group based on chat context and creating a new chat communication group, according to certain aspects of the present disclosure. One or more computing devices (e.g., the chat and video conference provider 110) implement operations depicted in FIG. 7 by executing suitable program code. For illustrative purposes, the process 700 is described with reference to certain examples depicted in the figures. Other implementations, however, are possible.

At block 705, the process 700 involves establishing a chat communication group. As discussed above with respect to block 405 of FIG. 4, the chat video conference provider 110 may establish a chat channel, a group chat, or a one-on-one chat. Users are able to exchange chat messages between each other within the chat communication group. In some examples, the chat messages include text and files, such as documents, images, video clips, audio clips, and so on.

At block 710, the process 700 involves the chat and video conference provider 110 generating a summary of the chat messages in the chat communication group. As discussed above in detail with respect to block 410 of FIG. 4, the chat and video conference provider 110 can apply a machine learning model to the chat messages in the chat communication group. The machine learning model can be a language model trained to generate a text summary for text messages collected in a chat communication group. Depending on the configuration, the machine learning model can take the text messages as input to generate the text summary. Alternatively, or additionally, the machine learning model can be trained to take documents as input in addition to the text messages. Further, the chat and video conference provider 110 may generate or otherwise extract texts from non-text chat messages, such as extracting text from an image or generating text describing the content of the image, extracting transcript of an audio or video, and so on. The extracted texts from the non-text chat message allow the machine learning model to be used to generate the chat summary. In some examples, the machine learning model is used to generate a chat summary for a portion of the chat messages in the chat communication group, such as chat messages in a conversation or in a past time period. Another chat summary can be generated for another portion of the chat messages.

At block 715, the process 700 involves identifying relevant users to the chat communication group based on the chat summary. As discussed above in detail with respect to block 415 of FIG. 4, identifying a relevant user can be performed by matching keywords or topics from the chat summary with user data in the user records 104. In addition, the chat and video conference provider 110 can also identify the relevant user directly from the chat messages, such as through explicit identification or mentioning of the user.

Figure 8A:
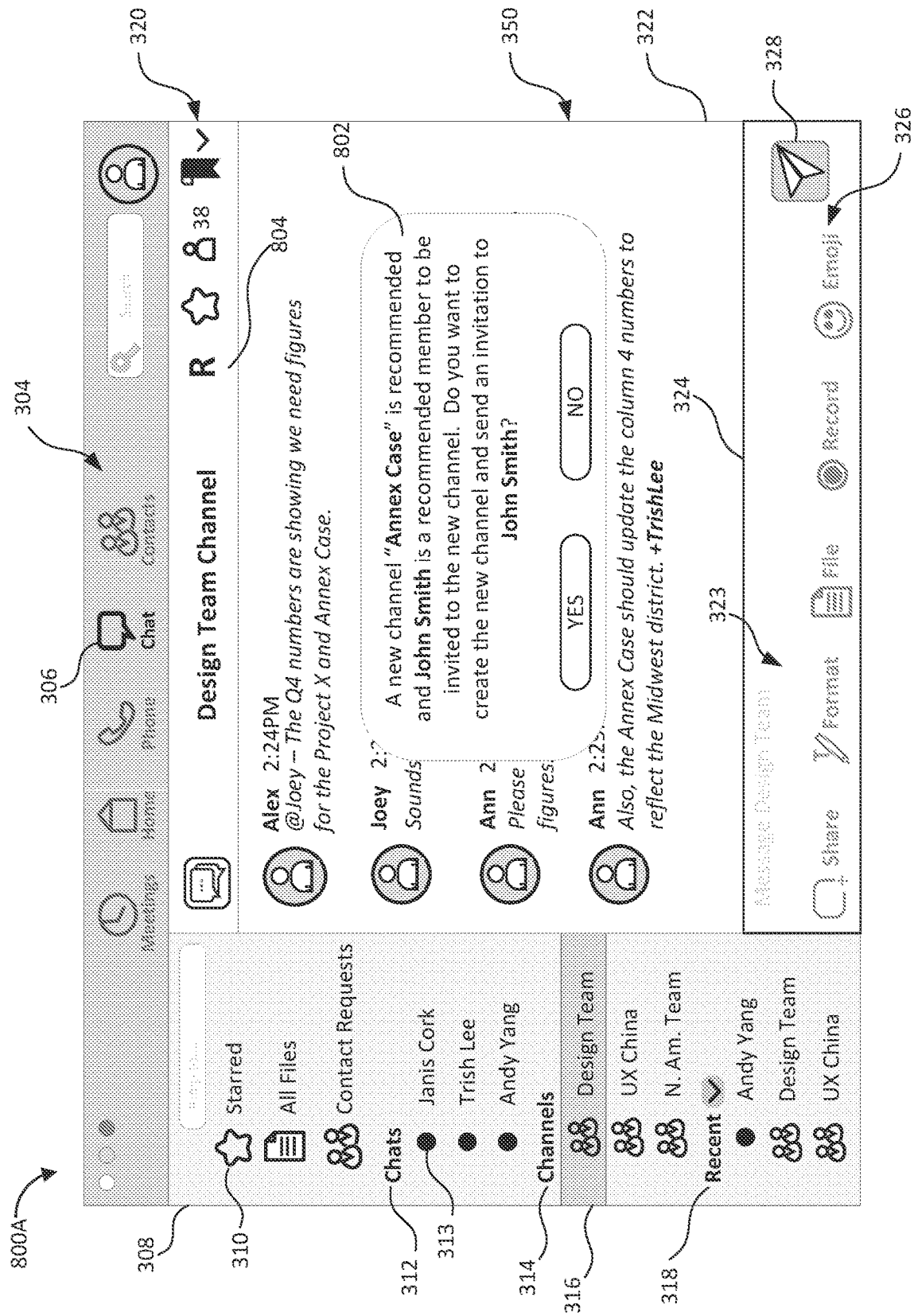
FIG. 8A shows an example of a user interface presented on a computing device associated with a host of a chat communication group for obtaining approval of creating a new chat communication group and inviting identified relevant users joining the new chat communication group, according to certain aspects of the present disclosure.

At block 720, the process 700 involves creating a new chat communication group and inviting the identified relevant users to the new chat communication group. In some examples, the creation of the new chat communication group and the invitation to the identified relevant users are performed at the approval of a host of the chat communication group. Such an approval can be obtained through a user interface presented on the computing device associated with the host of the chat communication group. FIG. 8A shows an example of such a user interface. The example user interface 800A shown in FIG. 8A is based on the example user interface 300 shown in FIG. 3 and is similar to the example shown in FIG. 6A. In this example, the chat and video conference provider 110 has identified similar to the example shown in FIG. 6A that John Smith is a relevant user and further determines that a new chat communication group focusing on the "Annex Case" should be created. The chat and video conference provider 110 presents a message box 802 informing the host of the Design Team Channel that John Smith has been identified as a relevant user and recommending creating a new chat channel inviting him to the new chat channel. The host can approve the recommendation by clicking the "Yes" button and the chat and video conference provider 110 will create a new chat channel "Annex Case" and invite the John Smith to the new chat channel. The host may decline the recommendation by clicking the "No" button and no new chat channel will be created, nor John Smith will be invited to the chat channel.

Similar to the example shown in FIG. 6A, the UI 800A also includes a user interface control 804 which when activated will display all the recommended users to be invited to the chat. This allows the host to accept or decline recommendations or change the approval decisions at a later time.

Referring back to FIG. 7, at block 725, the process 700 involves presenting chat summaries in the new chat communication group. Presenting chat summaries generated for the chat communication group in the new chat communication group to allow the newly joined users to catch up with the discussion in the chat communication group quickly. Similar to block 425 discussed above with respect to FIG. 4, the chat summaries generated for the chat communication group are presented to the host of the chat communication group to allow the host to select the chat summaries that can be seen by the newly joined users of the new chat communication group.

Figure 8B:
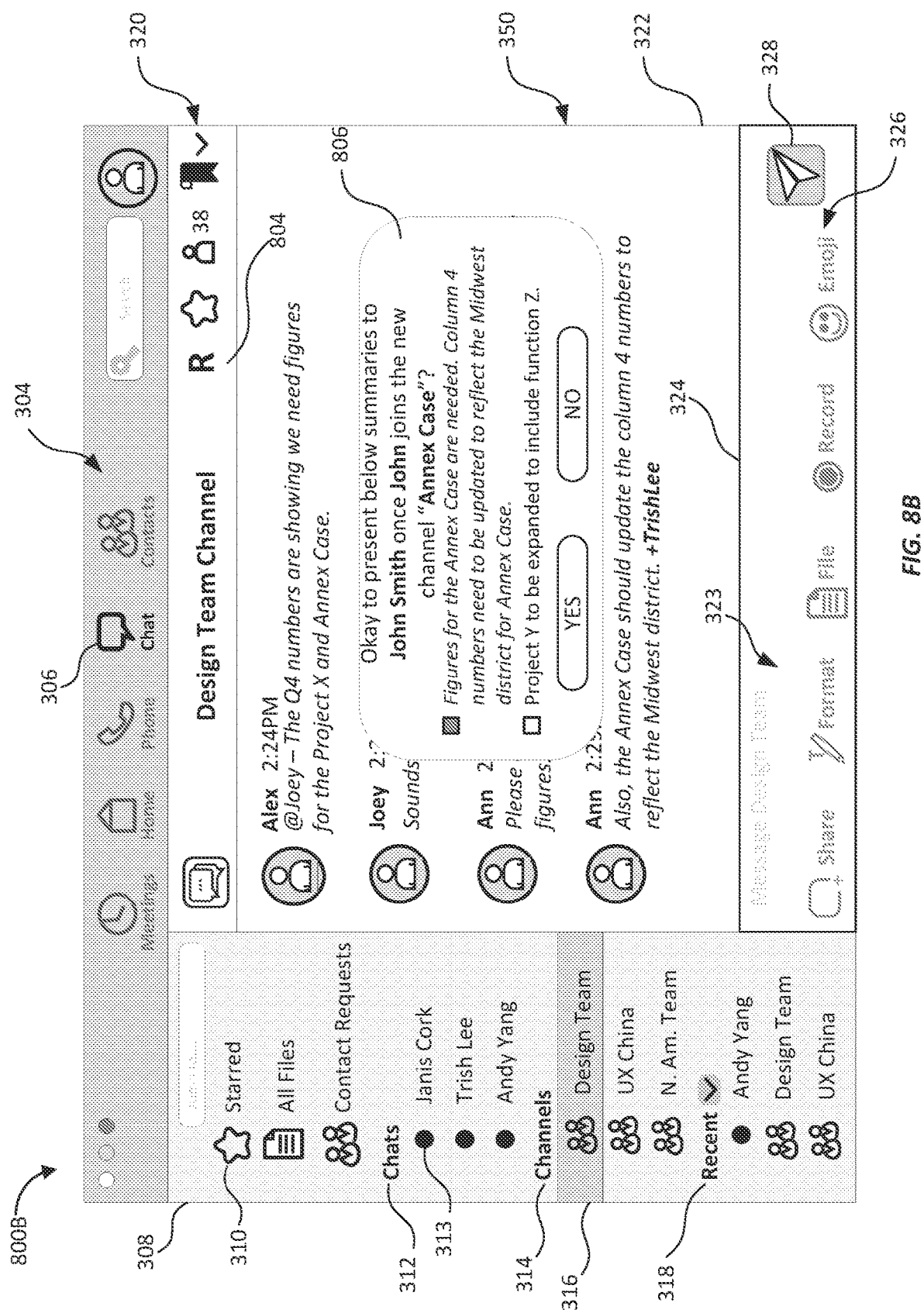
FIG. 8B shows an example of a user interface presented to the host for selecting chat summaries to be displayed in a new chat communication group, according to certain aspects of the present disclosure.

FIG. 8B shows an example of the user interface 800B presented to the host for selecting chat summaries. The example UI 800B is similar to the example UI 600B shown in FIG. 6B and is based on the example user interface 800A shown in FIG. 8A. In this example, the chat and video conference provider 110 presents a message box 806 to ask the host to select the chat summaries to be presented to the identified relevant user of the new chat communication group. The message box 806 may be presented after the host clicks the "Yes" button on the message box 802. The chat summaries listed in the message box 806 can include summaries in a predetermined past time period, such as in the past 2 weeks. Alternatively, or additionally, the listed chat summaries can be determined by the chat and video conference provider 110 as those summaries that are relevant to the new user and the new chat communication group. The host can deselect the summaries that the host does not want the new user to see before clicking on the "OK" button to authorize the display of the chat summaries in the new chat communication group. In the example shown in FIG. 8B, the host has deselected the second recommended chat summary and only allows the first chat summary to be presented in the chat UI when the new user John Smith joins the new chat channel "Annex Case." Note that in some examples, the chat and video conference provider 110 can modify the chat summaries to remove information unrelated to the newly created chat communication group. For example, the first chat summary shown in the message box 806 has been modified to remove the information for project X which is unrelated to the Annex Case.

Figure 8C:
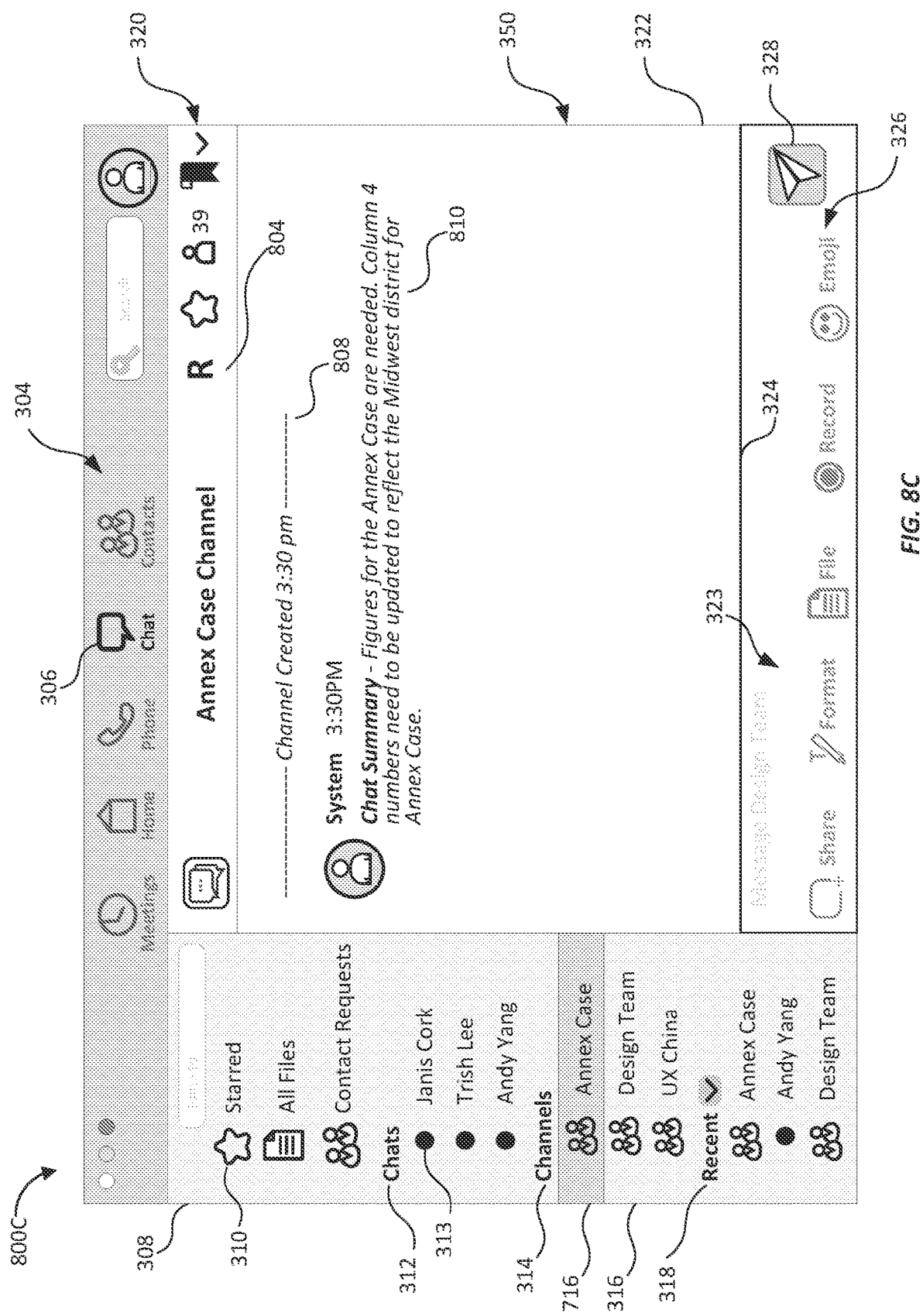
FIG. 8C shows an example of a user interface of a newly created chat communication group, according to certain aspects of the present disclosure.

FIG. 8C shows an example of the user interface of the newly created chat communication group "the Annex Case Channel." In this example, all the existing users of the previous chat channel "Design Team Channel" are invited to the new chat channel as well as the newly identified user John Smith. In other examples, a portion of the existing users of the previous chat channel are invited to the new chat channel. As shown in FIG. 8C, a notification 808 is shown in the chat messaging panel 322 indicating that the chat channel has been created and the timestamp of the creation. Further, the chat summary 810 that has been approved by the host is also shown in the chat messaging panel 322 so that every user of the new chat channel is able to review it. In addition, the channels 314 list is updated to include the newly created chat channel as well as the recent 318 list.

Referring back to FIG. 7, in addition to presenting the summary in the chat communication group, block 725 may also involve identifying and presenting messages in the historical (archived) conversation in the first chat communication group to the users in the second chat communication group. The user can trim these messages as appropriate. The chat and video conference provider 110 can identify different portions of the historical conversions of the first chat communication group for different users in the second chat communication group based on, for example, the respective user records. For example, the chat and video conference provider 110 can match the messages in the historical conversation with the respective user records 104A-104C to identify the messages to be presented to the respective users in the second chat communication group. The identified messages may be presented to the host of the second chat communication group first to allow the host to select which participants can see which portion of the historical conversation. In addition, the host can also edit the identified messages before they are presented to the users.

The process 700 can repeat from block 710 where the chat and video conference provider 110 generates a chat summary for new chat messages posted since the generation of the last chat summary and identify new relevant users and expand the chat communication group as discussed above. Likewise, the chat and video conference provider 110 can also repeat the process 700 for the new chat communication group to expand the new chat communication group.

Figure 9:
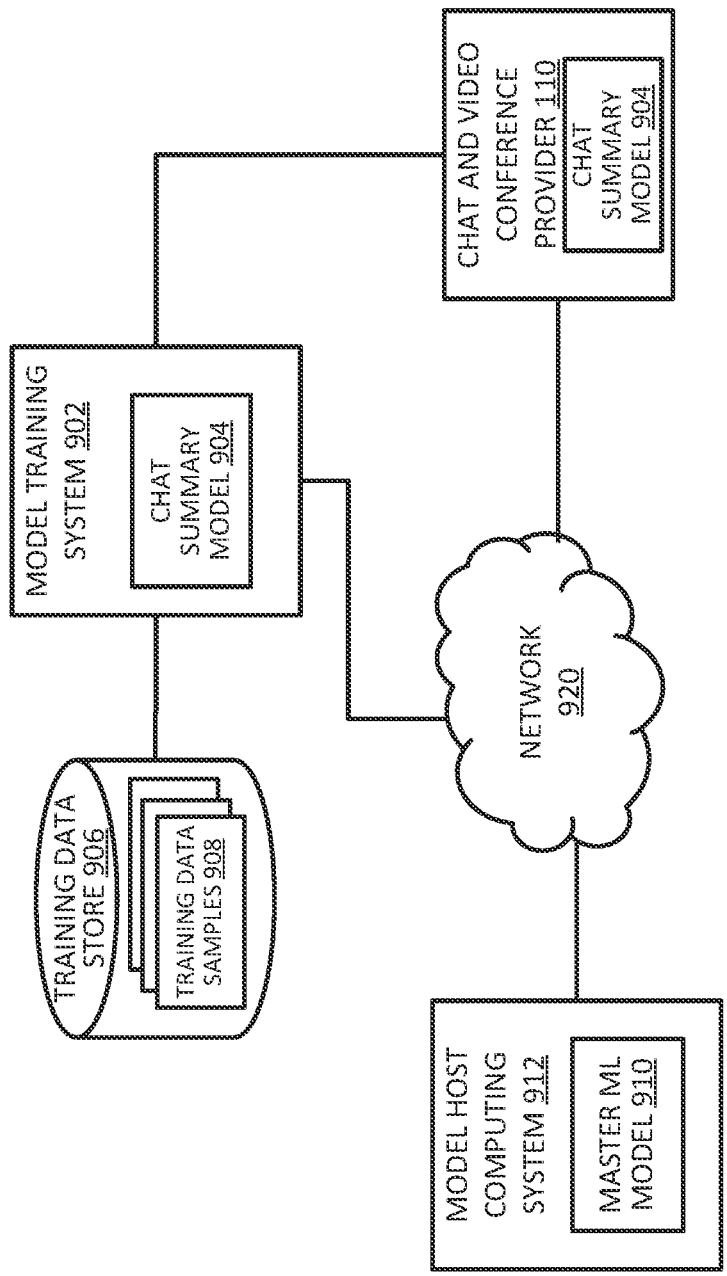
FIG. 9 shows an example system for training and using a machine learning model to generate a chat summary for chat messages, according to certain aspects of the present disclosure.

Referring now to FIG. 9, FIG. 9 shows an example system for training and using a machine learning model to generate a chat summary for chat messages, according to certain aspects of the present disclosure. As shown in FIG. 9, a model training system 902 is configured to train a chat summary model 904 using training data samples 908. In some examples, the chat summary model 904 is a Transformer based language model including an encoder neural network and a decoder neural network, both made of self-attention layers. The chat summary model 904 also includes cross-attention layers that bridge encoder and decoder layers. The input of the chat summary model 904 is a group of chat messages that are passed as a string of tokens, for example tokenized using a byte-level byte pair encoding scheme following Generative Pre-trained Transformer 2 (GPT-2). The output of the chat summary model 904 is the summary in the form of a string of tokenized tokens that are then converted into words.

The model training system 902 trains the chat summary model 904 using training data samples 908. A training data sample 908 includes a group of training chat messages and the corresponding training output chat summary. The group of chat messages for inputting into the chat summary model 904 can be identified based on the structure of the chat messages. In some systems, the chat messages are organized as a conversation including a main message followed by replies to the main message. Such a conversation can be used as input to the chat summary model 904 to generate the chat summary. In other examples, such as when the chat messages are not organized in a certain structure, the chat messages can be divided into groups based on factors such as time, topic, and the users participating the chat discussion. For instance, chat messages sent within a two-day time window can be put into one group of messages. Chat messages discussing a certain topic, such as the requirements of a project, can be classified as one group. Chat messages sent by a certain group of people are put into one group of messages. Chat messages can also be put into groups based on a combination of the above. The group of chat messages can be converted into an input embedding for inputting into the chat summary model, for example, by mapping each word or a portion of a word in the group of chat messages to a value.

To obtain the training output chat summaries, the model training system 902 can employ a master machine learning model 910 that is larger and more complex than the chat summary model 904 and has a higher accuracy (such as an accuracy higher than a threshold value). The model training system 902 can provide the training input chat messages to the master machine learning model 910 to generate a chat summary as the training output summary. In this way, the training data samples 908 can be generated faster than human providing the chat summaries. Further, it is also faster for the chat summary model 904 to learn from the master machine learning model 910 than from the training output provided by human. This also allows the chat summary model 904, which is much smaller and simpler, to learn from the more accurate master machine learning model. The training determines the parameters of the chat summary model 904 by minimizing a loss function defined using the training data samples 908.

In some examples, the training is performed by fine-tuning a pre-trained model. It is likely that the pre-trained model does not satisfy the need for chat summary generation. For example, the input of the pre-trained model may be set to a smaller size than needed for accepting the chat messages as input. In those cases, the input size of the model can be increased to cover the length of the input messages by, for example, extending the positional embeddings. For instance, to increase the input size of the model from 1024 to 4096, positional embeddings can be initialized by copying the embedding of positions 0 to 1023 of the pre-trained model to embeddings of positions 0 to 1023, 1024 to 2047, 2048 to 3071 and 3072 to 4096 and then these embeddings are tuned along with other parameters of the model through training.

To further reduce the size of the chat summary model 904, the model training system 902 can quantize the parameters of the chat summary model 904 obtained through the training. For example, the model parameters can be quantized from 32 bits to 8 bits. In this way, generating chat summaries using the chat summary model 904 can be sped up. The trained chat summary model 904 can be deployed to the chat and video conference provider 110 for use in generating the chat summaries as discussed above.

Figure 10:
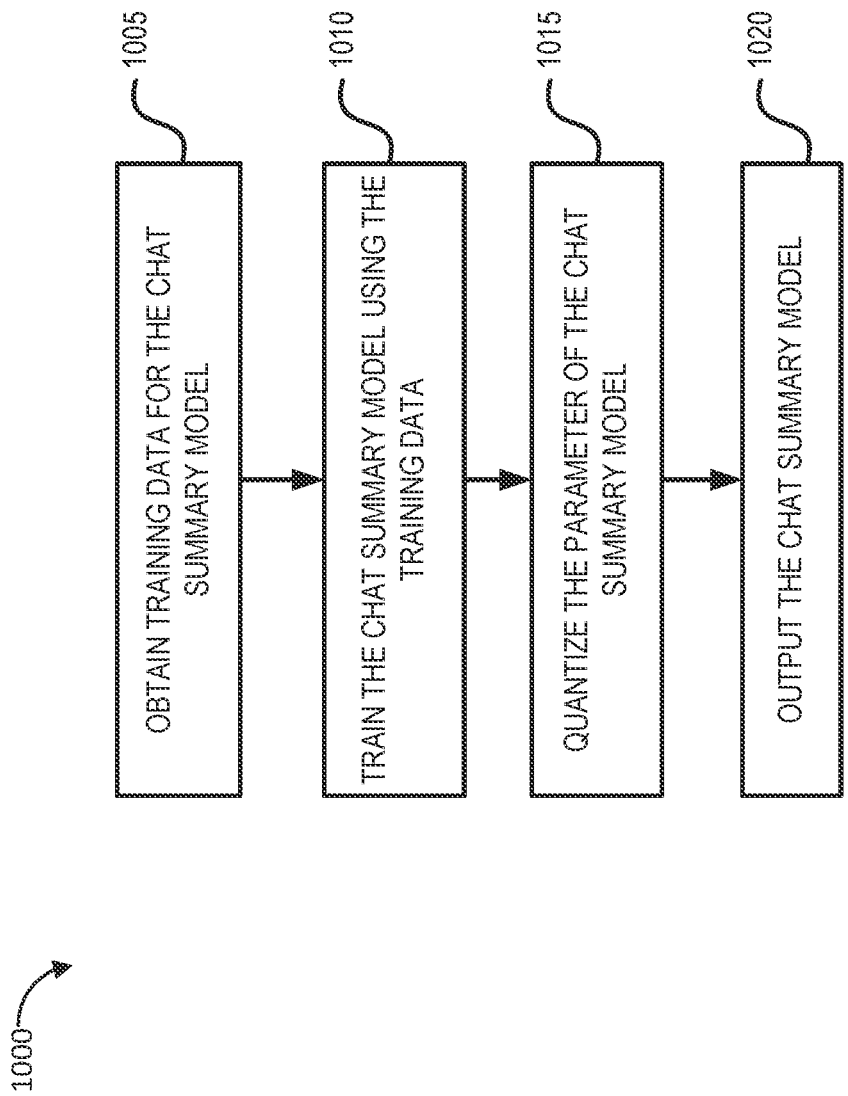
FIG. 10 shows a flowchart of an example process for training a chat summary model, according to certain aspects of the present disclosure.

FIG. 10 shows a flowchart of an example process 1000 for training a chat summary model, according to certain aspects of the present disclosure. One or more computing devices (e.g., the model training system 902) implement operations depicted in FIG. 10 by executing suitable program code. For illustrative purposes, the process 1000 is described with reference to certain examples depicted in the figures. Other implementations, however, are possible.

At block 1005, the process 1000 involves obtaining training data samples for the chat summary model. As discussed in detail above with respect to FIG. 9, a training data sample can include a group of chat messages as the training input. The training output can be the chat summary generated by the master machine learning model when provided the group of chat messages as input. At block 1010, the process 1000 involves training the chat summary model using the training data samples as described above with respect to FIG. 9. At block 1015, the process 1000 involves quantizing the parameters of the trained chat summary model to reduce the size the model. At 1020, the process 1000 involves outputting the trained chat summary model.

Figure 11:
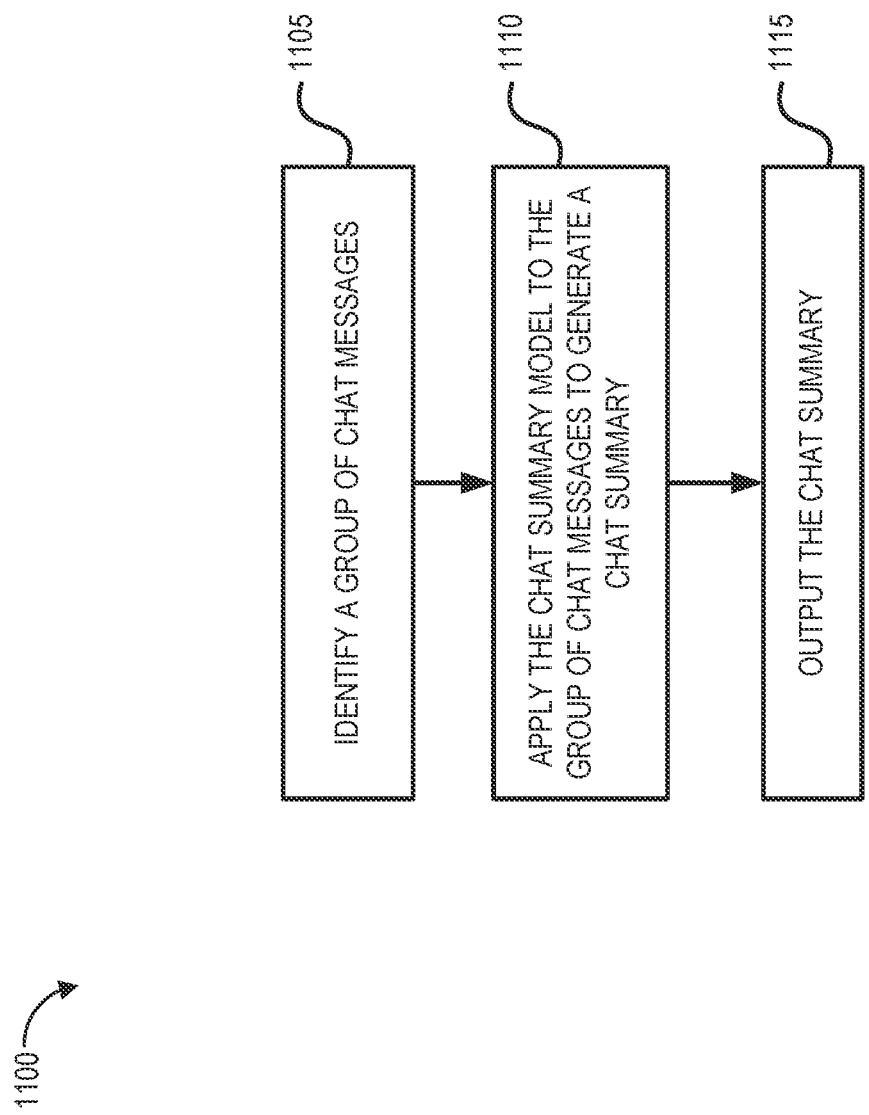
FIG. 11 shows a flowchart of an example process for using a chat summary model to generate a chat summary for a group of chat messages, according to certain aspects of the present disclosure.

FIG. 11 shows a flowchart of an example process 1100 for using a chat summary model to generate a chat summary for a group of chat messages, according to certain aspects of the present disclosure. One or more computing devices (e.g., the chat and video conference provider 110) implement operations depicted in FIG. 11 by executing suitable program code. For illustrative purposes, the process 1100 is described with reference to certain examples depicted in the figures. Other implementations, however, are possible.

At block 1105, the process 1100 involves identifying a group of chat messages as input to the chat summary model. As discussed above in detail with respect to FIG. 9, the group of messages can be identified based on the structure of the chat messages (e.g., chat messages in one conversation are used as one group of messages), the time of the chat messages, the topic of the messages, the users sending the messages, or any combination thereof.

At block 1110, the process 1100 involves applying the chat summary model to the group of chat messages. As discussed above, the chat summary model may have been quantized from a higher bit depth to a lower bit depth to reduce the size of the model and to speed up the summary generation model. To fully take advantage of the reduced bit depth of the model and speed up the process, the input token embeddings and the intermediate vectors generated by the chat summary model are also quantized to the lower bit depth. For example, the input token embedding may be represented using 32 bits. Before inputting the 32-bit token embedding to the model, the chat and video conference provider 110 can quantize the 32-bit token embedding to an 8-bit token embedding. Likewise, the output of the first layer of the model may be a 32-bit vector. The chat and video conference provider 110 can quantize such a vector to an 8-bit vector before feeding the vector into the next layer of the model. As a result, the computation at every layer of the model is performed on 8-bit values, leading to a much faster generation process of the chat summary. At block 1115, the process 1100 involves outputting the chat summary for use to, for example, identify relevant users to a chat communication group as discussed above with respect to FIGS. 3-8C.

Figure 12:
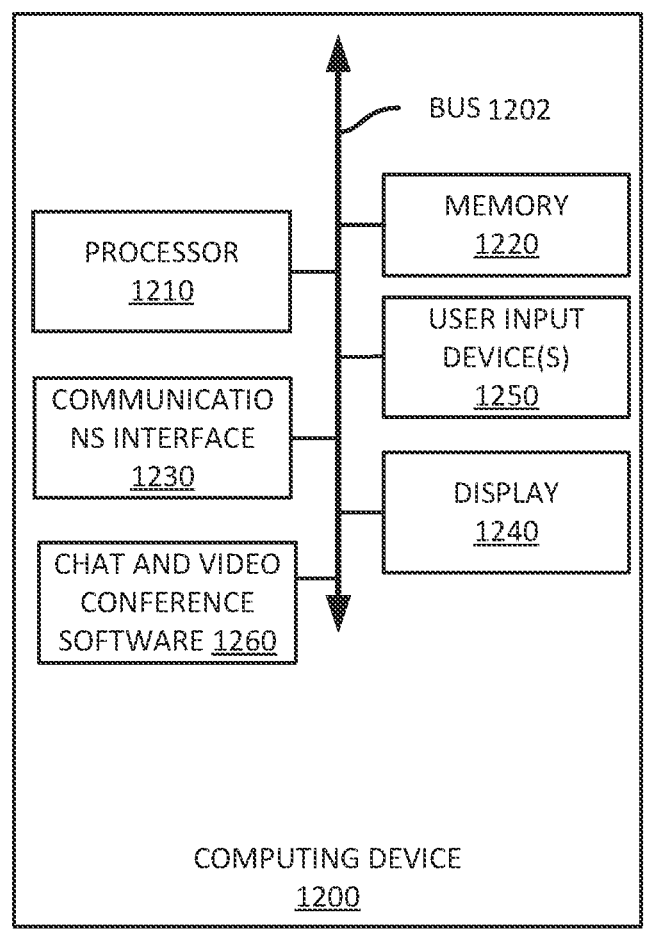
FIG. 12 shows an example computing device suitable for performing certain aspects of the present disclosure.

Referring now to FIG. 12, FIG. 12 shows an example computing device 1200 suitable for performing certain aspects of the present disclosure. The example computing device 1200 includes a processor 1210 which is in communication with the memory 1220 and other components of the computing device 1200 using one or more communications buses 1202. The processor 1210 is configured to execute processor-executable instructions stored in the memory 1220 to perform one or more processes for expanding chat communication groups based on a chat context, such as part or all of the example process 400 described above with respect to FIG. 4, or example process 700 described above with respect to FIG. 7, or for training or using the chat summary model, such as part or all of the example process 1000 described above with respect to FIG. 10, or example process 1100 described above with respect to FIG. 11. For example, the chat and video conferencing software 1260 provided on the computing device 1200 may provide instructions for performing one or more steps of the processes 400 or 700 for expanding chat communication groups based on a chat context or the processes 1000 or 1100 for training or using the chat summary model. The computing device, in this example, also includes one or more user input devices 1250, such as a keyboard, mouse, touchscreen, video input device (e.g., one or more cameras), microphone, etc., to accept user input. The computing device 1200 also includes a display 1240 to provide visual output to a user.

The computing device 1200 also includes a communications interface 1230. In some examples, the communications interface 1230 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, which may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

These illustrative examples are mentioned not to limit or define the scope of this disclosure, but rather to provide examples to aid understanding thereof. Illustrative examples are discussed above in the Detailed Description, which provides further description. Advantages offered by various examples may be further understood by examining this specification.

As used below, any reference to a series of examples is to be understood as a reference to each of those examples disjunctively (e.g., "Examples 1-4" is to be understood as "Examples 1, 2, 3, or 4").

Example #1: a method performed by one or more computing devices, the method comprising: establishing a first chat communication group for exchanging chat messages between a plurality of client devices; establishing a first chat communication group for exchanging chat messages between a plurality of client devices; generating a chat summary for a subset of the chat messages within the first chat communication group; determining a relevant user of the first chat communication group based on the chat summary; providing a recommendation for inviting the relevant user a second chat communication group; establishing the second chat communication group; and presenting at least one of the chat summary or a message of the first chat communication group in the second chat communication group in response to the relevant user joining the second chat communication group.

Example #2: the method of Example #1, wherein the relevant user is determined by: matching keywords associated with the chat summary with a user record in a data store; determining a number of matches of the keywords with the user record; and determine a user associated with the user record as the relevant user based on the number of matches exceeding a threshold value.

Example #3: the method of Examples #1-2, further comprising: generating a second chat summary of a second subset of the chat messages within the second chat communication group; determining a second relevant user of the second chat communication group based on the second chat summary; providing a recommendation for inviting the second relevant user to a third chat communication group; establishing the third chat communication group; and presenting the second chat summary in the third chat communication group in response to the second relevant user joining the third chat communication group.

Example #4: the method of Examples #1-3, wherein providing the recommendation for inviting the relevant user to the second chat communication group comprises presenting the recommendation in a user interface to a client computing device associated with a host of the first chat communication group, the processor configured to execute further processor-executable instructions stored in the non-transitory computer-readable medium to: receive an approval from the client computing device associated with the host of the second chat communication group; and admit the relevant user to the second chat communication group.

Example #5: the method of Examples #1-4, wherein the chat summary of the subset of the chat messages is generated by applying a chat summary model to the subset of the chat messages.

Example #6: the method of Examples #1-5, wherein the chat summary model is trained using training data samples, wherein a training data sample comprises a group of chat messages and a chat summary generated by a second machine learning model with the group of chat messages as input.

Example #7: the method of Examples #1-6, wherein parameters of the trained chat summary model are quantized to reduce a number of bits used to represent the parameters and wherein the chat summary of the chat messages is generated by applying the trained chat summary model with quantized parameters.

Example #8: the method of Examples #1-7, wherein applying the chat summary model to the chat messages comprises: generating input embeddings for the subset of the chat messages; quantizing the input embeddings to reduce a number of bits used to represent the input embeddings; providing the quantized input embeddings to the chat summary model to generate an intermediate vector by a first layer of the chat summary model; quantizing the intermediate vector to reduce a number of bits used to represent the intermediate vector; and providing the quantized intermediate vector to a second layer of the chat summary model to generate the chat summary.

Example #9: a system comprising: a non-transitory computer-readable medium; a communications interface; and a processor communicatively coupled to the non-transitory computer-readable medium and the communications interface, the processor configured to execute processor-executable instructions stored in the non-transitory computer-readable medium to: establish a first chat communication group for exchanging chat messages between a plurality of client devices; generate a chat summary for a subset of the chat messages within the first chat communication group; determine a relevant user of the first chat communication group based on the chat summary; provide a recommendation for inviting the relevant user a second chat communication group; establish the second chat communication group; and present at least one of the chat summary or a message of the first chat communication group in the second chat communication group in response to the relevant user joining the second chat communication group.

Example #10: the system of Example #9, wherein the relevant user is determined by: matching keywords associated with the chat summary with a user record in a data store; determining a number of matches of the keywords with the user record; and determine a user associated with the user record as the relevant user based on the number of matches exceeding a threshold value.

Example #11: the system of Examples #9-10, wherein the processor is configured to execute further processor-executable instructions stored in the non-transitory computer-readable medium to: generate a second chat summary of a second subset of the chat messages within the second chat communication group; determine a second relevant user of the second chat communication group based on the second chat summary; provide a recommendation for inviting the second relevant user to a third chat communication group; establish the third chat communication group; and present the second chat summary in the third chat communication group in response to the second relevant user joining the third chat communication group.

Example #12: the system of Examples #9-11, wherein providing the recommendation for inviting the relevant user to the second chat communication group comprises presenting the recommendation in a user interface to a client computing device associated with a host of the first chat communication group, the processor configured to execute further processor-executable instructions stored in the non-transitory computer-readable medium to: receive an approval from the client computing device associated with the host of the second chat communication group; and admit the relevant user to the second chat communication group.

Example #13: the system of Examples #9-12, wherein the chat summary of the subset of the chat messages is generated by applying a chat summary model to the subset of the chat messages. Example #14: the system of Examples #9-13, wherein the chat summary model is trained using training data samples, wherein a training data sample comprises a group of chat messages and a chat summary generated by a second machine learning model with the group of chat messages as input.

Example #15: the system of Examples #9-14, wherein parameters of the trained chat summary model are quantized to reduce a number of bits used to represent the parameters and wherein the chat summary of the chat messages is generated by applying the trained chat summary model with quantized parameters.

Example #16: the system of Examples #9-15, wherein applying the chat summary model to the chat messages comprises: generating input embeddings for the subset of the chat messages; quantizing the input embeddings to reduce a number of bits used to represent the input embeddings; providing the quantized input embeddings to the chat summary model to generate an intermediate vector by a first layer of the chat summary model; quantizing the intermediate vector to reduce a number of bits used to represent the intermediate vector; and providing the quantized intermediate vector to a second layer of the chat summary model to generate the chat summary.

Example #17: a non-transitory computer-readable medium comprising processor-executable instructions configured to cause one or more processors to: establish a first chat communication group for exchanging chat messages between a plurality of client devices; generate a chat summary for a subset of the chat messages within the first chat communication group; determine a relevant user of the first chat communication group based on the chat summary; provide a recommendation for inviting the relevant user a second chat communication group; establish the second chat communication group; and present at least one of the chat summary or a message of the first chat communication group in the second chat communication group in response to the relevant user joining the second chat communication group.

Example #18: the non-transitory computer-readable medium of Example #17, wherein the relevant user is determined by: matching keywords associated with the chat summary with a user record in a data store; determining a number of matches of the keywords with the user record; and determining a user associated with the user record as the relevant user based on the number of matches exceeding a threshold value.

Example #19: the non-transitory computer-readable medium of Examples #17-18, wherein providing the recommendation for inviting the relevant user to the second chat communication group comprises presenting the recommendation in a user interface to a client computing device associated with a host of the first chat communication group, the processor configured to execute further processor-executable instructions stored in the non-transitory computer-readable medium to: receive an approval from the client computing device associated with the host of the second chat communication group; and admit the relevant user to the second chat communication group.

Example #20: the non-transitory computer-readable medium of claim Examples #17-19, wherein the chat summary of the subset of the chat messages is generated by applying a chat summary model to the subset of the chat messages.

Example #21: a method performed by one or more computing devices, the method comprising: establishing a chat communication group for exchanging chat messages between a plurality of client devices; generating a chat summary for a subset of the chat messages within the chat communication group; determining a relevant user of the chat communication group based on the chat summary; providing a recommendation for inviting the relevant user to the chat communication group; and presenting the chat summary in the chat communication group in response to the relevant user joining the chat communication group.

Example #22: the method of example 21, wherein the relevant user is determined via an identification of the relevant user in the chat messages.

Example #23: the method of examples 21-22, wherein the relevant user is determined by: matching keywords associated with the chat summary with a user record in a data store; determining a number of matches of the keywords with the user record; and determine a user associated with the user record as the relevant user based on the number of matches exceeding a threshold value.

Example #24: the method of examples 21-23, further comprising: generating a second chat summary of a second subset of the chat messages within the chat communication group; determining a second relevant user of the chat communication group based on the second chat summary; providing a recommendation for inviting the second relevant user to the chat communication group; and presenting the second chat summary in the chat communication group in response to the second relevant user joining the chat communication group.

Example #25: the method of examples 21-24, wherein providing the recommendation for inviting the relevant user to the chat communication group comprises presenting the recommendation in a user interface to a client computing device associated with a host of the chat communication group, the method further comprising: receiving an approval from the client computing device associated with the host of the chat communication group; and admitting the relevant user to the chat communication group.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

The invention claimed is:

1. A method performed by one or more computing devices, the method comprising:
   establishing a first chat communication group for exchanging chat messages between a plurality of client devices;
   inputting a subset of the chat messages within the first chat communication group to a trained machine learning ("ML") model to generate a chat summary of the subset of the chat messages;
   determining a relevant user of the first chat communication group based on the chat summary;
   providing a recommendation for inviting the relevant user to a second chat communication group;

establishing the second chat communication group; and presenting at least one of the chat summary or a message of the first chat communication group in the second chat communication group in response to the relevant user joining the second chat communication group.

2. The method of claim 1, wherein the relevant user is determined by:

matching keywords associated with the chat summary with a user record in a data store;

determining a number of matches of the keywords with the user record; and determining a user associated with the user record as the relevant user based on the number of matches exceeding a threshold value.

3. The method of claim 1, further comprising:

generating a second chat summary of a second subset of the chat messages within the second chat communication group;

determining a second relevant user of the second chat communication group based on the second chat summary;

providing a recommendation for inviting the second relevant user to a third chat communication group;

establishing the third chat communication group; and presenting the second chat summary in the third chat communication group in response to the second relevant user joining the third chat communication group.

4. The method of claim 1, wherein providing the recommendation for inviting the relevant user to the second chat communication group comprises presenting the recommendation in a user interface to a client computing device associated with a host of the first chat communication group, and further comprising:

receiving an approval from the client computing device associated with the host of the second chat communication group; and admitting the relevant user to the second chat communication group.

5. The method of claim 1, wherein the trained ML model is trained using training data samples, wherein a training data sample comprises a group of chat messages and a chat summary generated by a second machine learning model with the group of chat messages as input.

6. The method of claim 5, wherein parameters of the trained ML model are quantized to reduce a number of bits used to represent the parameters and wherein the chat summary of the chat messages is generated by applying the trained ML model with quantized parameters.

7. The method of claim 6, wherein applying the trained ML model to the chat messages comprises:

generating input embeddings for the subset of the chat messages;

quantizing the input embeddings to reduce a number of bits used to represent the input embeddings;

providing the quantized input embeddings to the trained ML model to generate an intermediate vector by a first layer of the trained ML model;

quantizing the intermediate vector to reduce a number of bits used to represent the intermediate vector; and providing the quantized intermediate vector to a second layer of the trained ML model to generate the chat summary.

8. A system comprising:

a non-transitory computer-readable medium;

a communications interface; and a processor communicatively coupled to the non-transitory computer-readable medium and the communications interface, the processor configured to execute processor-executable instructions stored in the non-transitory computer-readable medium to:

establish a first chat communication group for exchanging chat messages between a plurality of client devices;

input a subset of the chat messages within the first chat communication group to a trained machine learning model to generate a chat summary of the subset of the chat messages;

determine a relevant user of the first chat communication group based on the chat summary;

provide a recommendation for inviting the relevant user to a second chat communication group;

establish the second chat communication group; and present at least one of the chat summary or a message of the first chat communication group in the second chat communication group in response to the relevant user joining the second chat communication group.

9. The system of claim 8, wherein the processor is configured to execute further processor-executable instructions stored in the non-transitory computer-readable medium to:

match keywords associated with the chat summary with a user record in a data store;

determine a number of matches of the keywords with the user record; and determine a user associated with the user record as the relevant user based on the number of matches exceeding a threshold value.

10. The system of claim 8, wherein the processor is configured to execute further processor-executable instructions stored in the non-transitory computer-readable medium to:

generate a second chat summary of a second subset of the chat messages within the second chat communication group;

determine a second relevant user of the second chat communication group based on the second chat summary;

provide a recommendation for inviting the second relevant user to a third chat communication group;

establish the third chat communication group; and present the second chat summary in the third chat communication group in response to the second relevant user joining the third chat communication group.

11. The system of claim 8, wherein the processor is configured to execute further processor-executable instructions stored in the non-transitory computer-readable medium to:

present the recommendation in a user interface to a client computing device associated with a host of the first chat communication group;

receive an approval from the client computing device associated with the host of the second chat communication group; and admit the relevant user to the second chat communication group.

12. The system of claim 8, wherein the trained ML model is trained using training data samples, wherein a training data sample comprises a group of chat messages and a chat summary generated by a second machine learning model with the group of chat messages as input.

13. The system of claim 12, wherein the processor is configured to execute further processor-executable instructions stored in the non-transitory computer-readable medium to quantize parameters of the trained ML model to reduce a number of bits used to represent the parameters and apply the trained ML model with quantized parameters to generate the chat summary.

14. The system of claim 13, wherein the processor is configured to execute further processor-executable instructions stored in the non-transitory computer-readable medium to:
generate input embeddings for the subset of the chat messages;
quantize the input embeddings to reduce a number of bits used to represent the input embeddings;
provide the quantized input embeddings to the trained ML model to generate an intermediate vector by a first layer of the trained ML model;
quantize the intermediate vector to reduce a number of bits used to represent the intermediate vector; and
provide the quantized intermediate vector to a second layer of the trained ML model to generate the chat summary.

15. A non-transitory computer-readable medium comprising processor-executable instructions configured to cause one or more processors to:
establish a first chat communication group for exchanging chat messages between a plurality of client devices;
input a subset of the chat messages within the first chat communication group to a trained machine learning model to generate a chat summary of the subset of the chat messages;
determine a relevant user of the first chat communication group based on the chat summary;
provide a recommendation for inviting the relevant user to a second chat communication group;
establish the second chat communication group; and
present at least one of the chat summary or a message of the first chat communication group in the second chat communication group in response to the relevant user joining the second chat communication group.

16. The non-transitory computer-readable medium of claim 15, further comprising processor-executable instructions configured to cause the one or more processors to:
match keywords associated with the chat summary with a user record in a data store;
determine a number of matches of the keywords with the user record; and
determine a user associated with the user record as the relevant user based on the number of matches exceeding a threshold value.

17. The non-transitory computer-readable medium of claim 15,
further comprising processor-executable instructions configured to cause the one or more processors to:
present the recommendation in a user interface to a client computing device associated with a host of the first chat communication group;
receive an approval from the client computing device associated with the host of the second chat communication group; and
admit the relevant user to the second chat communication group.

* * * * *